(12) United States Patent
Gopal et al.

(10) Patent No.: US 10,313,129 B2
(45) Date of Patent: Jun. 4, 2019

(54) KEYED-HASH MESSAGE AUTHENTICATION CODE PROCESSORS, METHODS, SYSTEMS, AND INSTRUCTIONS

(71) Applicant: INTEL CORPORATION, Santa Clara, CA (US)

(72) Inventors: Vinodh Gopal, Westborough, MA (US); Jason W. Brandt, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/751,881

(22) Filed: Jun. 26, 2015

(65) Prior Publication Data

US 2016/0380772 A1 Dec. 29, 2016

(51) Int. Cl.
*H04L 9/32* (2006.01)
*G06F 21/64* (2013.01)
(Continued)

(52) U.S. Cl.
CPC ........ *H04L 9/3242* (2013.01); *G06F 9/30007* (2013.01); *G06F 9/30036* (2013.01);
(Continued)

(58) Field of Classification Search
CPC ... H04L 9/3242; H04L 9/3239; H04L 9/3236; H04L 2209/04; H04L 2209/12;
(Continued)

(56) References Cited

U.S. PATENT DOCUMENTS 4,933,969 A * 6/1990 Marshall ................. G06F 21/64
340/5.74
6,226,742 B1 * 5/2001 Jakubowski .......... H04L 9/0625
380/37
(Continued)

FOREIGN PATENT DOCUMENTS

JP 2005-318299 A 11/2005
JP 2011-114520 A 6/2011
WO 2016209536 A1 12/2016

OTHER PUBLICATIONS

FIPS "Secure Hash Standard (SHS)", Federal Information Processing Standards Publication, FIPS PUB 180-4, Mar. 2012, 37 pages.
(Continued)

*Primary Examiner* — Trong H Nguyen
(74) *Attorney, Agent, or Firm* — Nicholson De Vos Webster & Elliott LLP

(57) ABSTRACT

A processor of an aspect includes a decode unit to decode a keyed-hash message authentication code instruction. The keyed-hash message authentication code instruction is to indicate a message, to indicate at least one value that is to represent at least one of key information and key indication information, and to indicate a destination storage location. An execution unit is coupled with the decode unit. The execution unit, in response to the keyed-hash message authentication code instruction, is to store a message authentication code corresponding to the message in the destination storage location. The message authentication code is to be consistent with a keyed-hash message authentication code
(Continued)

algorithm that is to use a cryptographic hash algorithm. The message authentication code is to be based on a cryptographic key associated with the at least one value. Other processors, methods, systems, and instructions are disclosed.

27 Claims, 15 Drawing Sheets

(51) Int. Cl.
  *G09C 1/00* (2006.01)
  *G06F 9/30* (2018.01)
(52) U.S. Cl.
  CPC ............... *G06F 21/64* (2013.01); *G09C 1/00* (2013.01); *H04L 2209/04* (2013.01); *H04L 2209/12* (2013.01); *H04L 2209/125* (2013.01); *H04L 2209/16* (2013.01)
(58) Field of Classification Search
  CPC ........... H04L 2209/125; H04L 2209/16; G06F 9/30007; G06F 9/30036; G06F 21/64; G09C 1/00
  See application file for complete search history.

(56) References Cited

U.S. PATENT DOCUMENTS

| | | | | |
|---|---|---|---|---|
| 7,356,710 | B2* | 4/2008 | Lundvall | G06F 9/3001 380/225 |
| 2003/0212893 | A1* | 11/2003 | Hind | H04L 9/3236 713/177 |
| 2004/0230796 | A1* | 11/2004 | Lundvall | G06F 9/3001 713/168 |
| 2006/0015748 | A1* | 1/2006 | Goto | G06F 21/52 713/190 |
| 2006/0242429 | A1* | 10/2006 | Holtzman | G06F 21/72 713/189 |
| 2008/0098215 | A1 | 4/2008 | Belgaied et al. | |
| 2009/0089576 | A1* | 4/2009 | Johnston | H04W 12/02 713/160 |
| 2009/0327716 | A1* | 12/2009 | Raju | H04L 9/3242 713/168 |
| 2011/0302418 | A1* | 12/2011 | Fujisaki | H04L 9/0816 713/179 |
| 2011/0320825 | A1* | 12/2011 | Greiner | G06F 9/30003 713/190 |
| 2014/0157002 | A1 | 6/2014 | Grobman et al. | |
| 2014/0237237 | A1 | 8/2014 | Brumley et al. | |
| 2014/0310524 | A1 | 10/2014 | Yamanaka et al. | |
| 2015/0098563 | A1 | 4/2015 | Gulley et al. | |

OTHER PUBLICATIONS

FIPS "The Keyed-Hash Message Authentication Code (HMAC)", Federal Information Processing Standards Publication, FIPS PUB 198-1, Jul. 2008, 13 pages.
Krawczyk, et al., "HMAC: Keyed-Hashing for Message Authentication", Network Working Group, Request for Comments: 2104, Feb. 1997, 11 pages.
Wikipedia, "Hash-based message authentication code", From Wikipedia, the free encyclopedia, Retrieved on Apr. 17, 2015, 7 pages.
Wikipedia, "Secure Hash Algorithm", From Wikipedia, the free encyclopedia, Retrieved on Apr. 17, 2015, 3 pages.
Wikipedia, "SHA-2", From Wikipedia, the free encyclopedia, Retrieved on Apr. 17, 2015, 11 pages.
Wikipedia, "SHA-3", From Wikipedia, the free encyclopedia, Retrieved on Apr. 17, 2015, 8 pages.
International Search Report and Written Opinion received for PCT Patent Application No. PCT/US2016/034396, dated Sep. 7, 2016, 10 pages.
International Preliminary Report on Patentability for Application No. PCT/US2016/034396, dated Jan. 4, 2018, 8 pages.
Extended European Search Report for Application No. 16814982.1, dated Jan. 18, 2019, 9 pages.
Perito D., et al., "TrustworthyCode Execution on Embedded Devices Garanties d'execution de code sur systems ambarque," Universite De Grenoble, Oct. 13, 2011, 112 pages.

* cited by examiner

FIG. 8

KEYED-HASH MAC WITH OBFUSCATED KEY INFORMATION INSTRUCTION 801

| OPCODE 860 | MESSAGE INDICATION FIELD 808 | OBFUSCATED KEY INFORMATION INDICATION FIELD 809 | DESTINATION INDICATION FIELD 861 | HASH ALGORITHM INDICATION FIELD (OPTIONAL) 862 | NUMBER OF BLOCKS INDICATION FIELD (OPTIONAL) 863 | MAC LENGTH INDICATION FIELD (OPTIONAL) 864 |

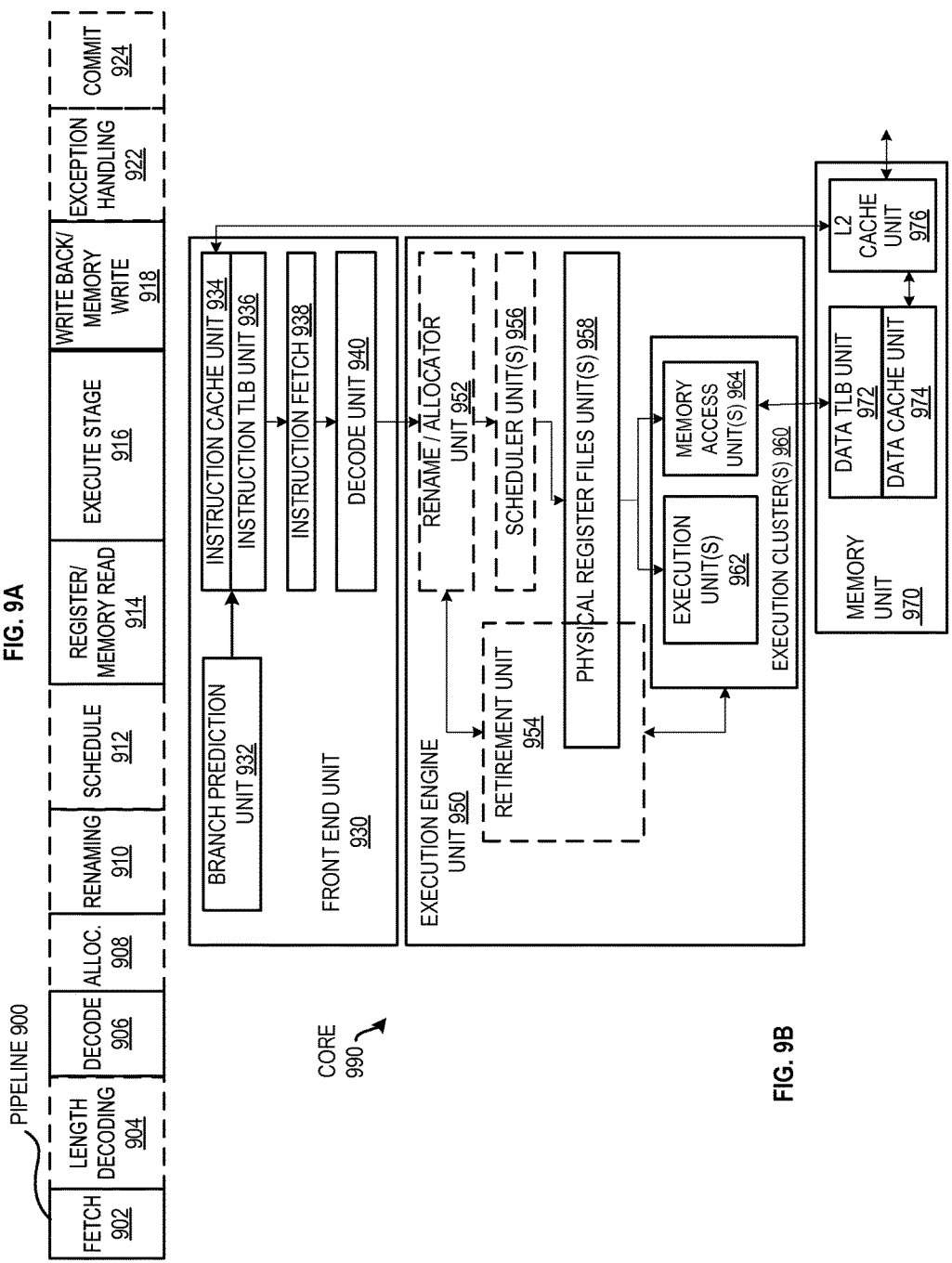

KEYED-HASH MESSAGE AUTHENTICATION CODE PROCESSORS, METHODS, SYSTEMS, AND INSTRUCTIONS

BACKGROUND

Technical Field

Embodiments described herein generally relate to processors. In particular, embodiments described herein generally relate to cryptography in processors.

Background Information

In communications and computing it is often desirable to be able to check the data integrity of information transmitted over and/or stored in an unreliable medium. This may help to ensure that the information has not been corrupted or changed during such transmission or storage. It is also often desirable to be able to check the authenticity of information transmitted over and/or stored in an unreliable medium. This may help to ensure that the information has come from a reliable or authenticatable source.

BRIEF DESCRIPTION OF THE DRAWINGS

The invention may best be understood by referring to the following description and accompanying drawings that are used to illustrate embodiments. In the drawings:

FIG. 8 is a block diagram of an example embodiment of a keyed-hash MAC with obfuscated key information instruction.

FIG. 9A is a block diagram illustrating an embodiment of an in-order pipeline and an embodiment of a register renaming out-of-order issue/execution pipeline.

FIG. 9B is a block diagram of an embodiment of processor core including a front end unit coupled to an execution engine unit and both coupled to a memory unit.

1. DETAILED DESCRIPTION OF EMBODIMENTS

Disclosed herein are keyed-hash message authentication code (MAC) instructions, processors to execute the instructions, methods performed by the processors when processing or executing the instructions, and systems incorporating one or more processors to process or execute the instructions. In some embodiments, the instructions may be keyed-hash MAC with key information instructions. These instructions may help to accelerate the implementation of keyed-hash MAC algorithms. In other embodiments, the instructions are keyed-hash MAC with obfuscated key information instructions. These instructions may also help to accelerate the implementation of keyed-hash MAC algorithms. In addition, these instructions obfuscate the key information, which may help to keep the key information secret or confidential. In the following description, numerous specific details are set forth (e.g., specific instruction operations, data formats, processor configurations, microarchitectural details, sequences of operations, etc.). However, embodiments may be practiced without these specific details. In other instances, well-known circuits, structures and techniques have not been shown in detail to avoid obscuring the understanding of the description.

Figure 1:
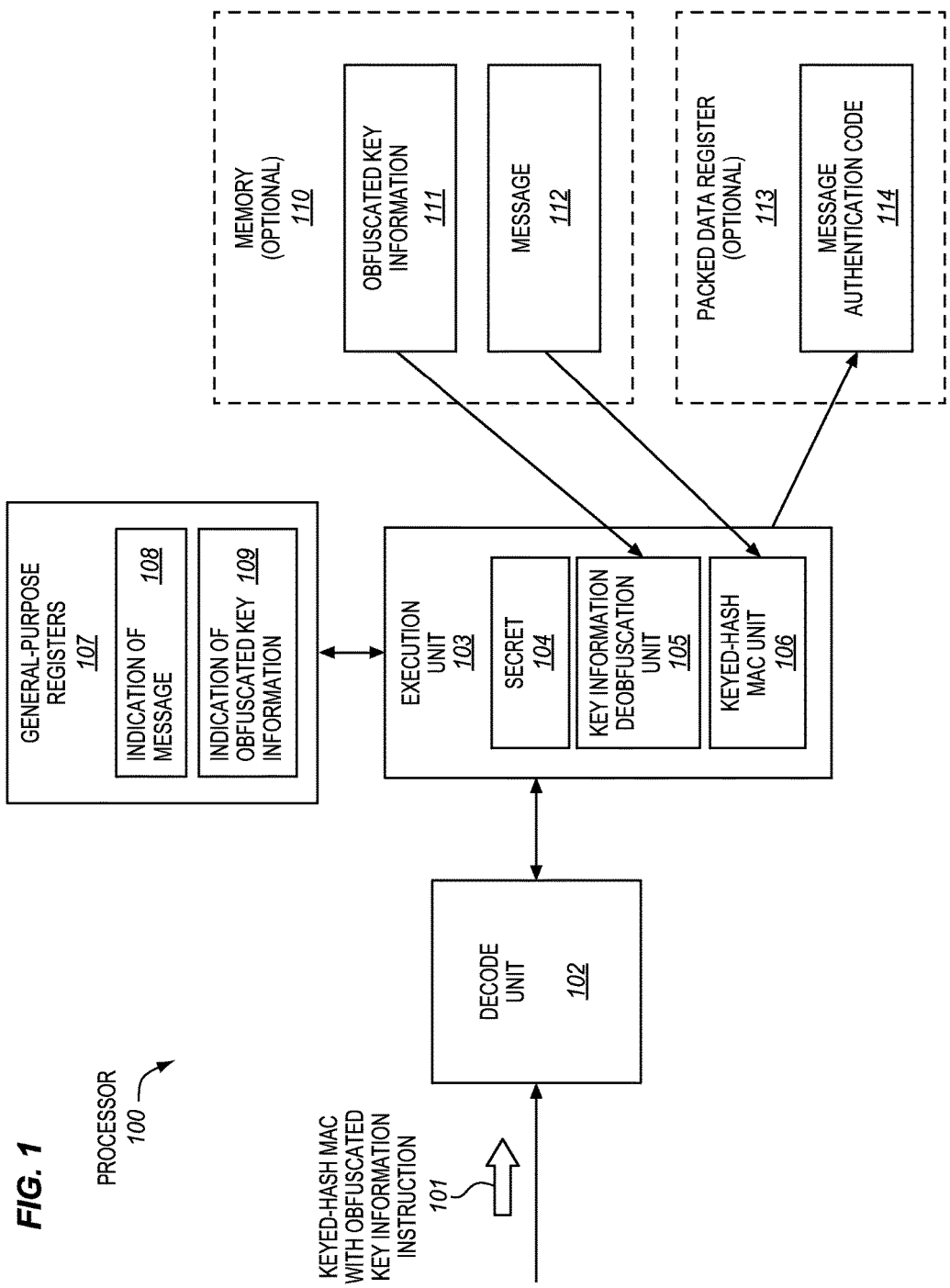
FIG. 1 is a block diagram of an embodiment of a processor that is operative to perform an embodiment of a keyed-hash MAC with obfuscated key information instruction.

FIG. 1 is a block diagram of an embodiment of a processor 100 that is operative to perform an embodiment of a keyed-hash MAC with obfuscated key information instruction 101. In some embodiments, the processor may be a general-purpose processor (e.g., a general-purpose microprocessor or central processing unit (CPU) of the type used in desktop, laptop, or other computers). Alternatively, the processor may be a special-purpose processor. Examples of suitable special-purpose processors include, but are not limited to, cryptographic processors, communications processors, network processors, co-processors, embedded processors, digital signal processors (DSPs), and controllers (e.g., microcontrollers). The processor may have any of various complex instruction set computing (CISC) architectures, reduced instruction set computing (RISC) architectures, very long instruction word (VLIW) architectures, hybrid architectures, other types of architectures, or have a combination of different architectures (e.g., different cores may have different architectures).

During operation, the processor may receive the keyed-hash MAC with obfuscated key information instruction 101. For example, the instruction may be received from memory over a bus or other interconnect. The instruction may represent a macroinstruction, assembly language instruction, machine code instruction, or other instruction or control signal of an instruction set of the processor.

The keyed-hash MAC with obfuscated key information instruction 101 may corresponds to, and may be used to implement, a keyed-hash MAC algorithm. The keyed hash MAC algorithm represents a type of MAC algorithm that is operative to calculate a MAC based on both a secret cryptographic key as well as a cryptographic hash algorithm. The calculated MAC may represents a cryptographic checksum that may be used to check or ensure both the integrity and the authenticity of data, for example, data transmitted over and/or stored in an unreliable medium. Ensuring the integrity of the data may help to ensure that the data has not been corrupted or changed since the MAC was computed (e.g., while the data is transmitted over the unreliable medium). Authenticating the data may help to ensure that the data was transmitted or otherwise provided by a reliable and authenticatable source. Since the secret cryptographic key is used for authentication, it should generally be kept secret or confidential so that only the intended users of the data know the secret cryptographic key and can mutually authenticate one another.

Representatively, in one illustrative example of use, the instruction 101 may be used by a message sender to perform a keyed-hash MAC algorithm to calculate a MAC for a message based on the secret cryptographic key and the cryptographic hash function. The message along with the MAC may be sent to the message recipient. The message recipient may use another instance of the instruction 101 to perform the same keyed-hash MAC algorithm on the received message to recalculate the MAC based on the same secret cryptographic key and the same cryptographic hash function. The recalculated MAC may be compared with the MAC received from the message sender. If the MACs match, then it may be inferred that the message was received with integrity, and that the message was received from an authenticated source. This is just one illustrative example. In another illustrative example of use, the instruction 101 may be used in a challenge-response identification protocols to perform a keyed-hash MAC algorithm to compute a response for a challenge message.

Different types of keyed-hash MAC algorithms are suitable for different embodiments. In some embodiments, the keyed-hash MAC algorithm may be the same as or at least compute MACs consistent with Federal Information Processing Standards (FIPS) Publication 198-1, published July 2008. Alternatively, the keyed-hash MAC algorithm may be the same as or at least compute MACs consistent with a revised version of that standard, a replacement of that standard, a derivative of that standard, a standard having similar features as that standard, or any other standard or keyed-hash MAC algorithm for which embodiments disclosed herein would be useful. The keyed-hash MAC described in FIPS Publication 198-1 is often referred to simply as HMAC. The HMAC is often expressed by either Equation 1 or 2 as follows:

a. $HMAC(K,m) = H((K \text{ XOR opad})|H((K \text{ XOR ipad})|m))$  Equation 1 b. $HMAC(K,m) = H(K1|H(K2|m))$  Equation 2

In this equation, H represents an iterative cryptographic hash algorithm, K represents a secret cryptographic key padded to the right with extra zeroes to the input block size of the hash algorithm or the hash of the original key if longer than the block size, m is the message to be authenticated, the symbol "|" represents concatenation, "XOR" represents an exclusive logical OR, opad represents an outer padding which has a one-block long hexadecimal constant value (0x5c5c5c5c . . . 5c), and ipad represents an inner padding which has a one-block long hexadecimal constant value (0x363636 . . . 3636).

Other keyed-hash MAC algorithms are also suitable, although they may not provide the same security as HMAC. By way of example, the keyed-hash MAC algorithm may be of the form of any of Equations 3-5 as follows:

a. $MAC(K,m) = H(K|m)$  Equation 3 b. $MAC(K,m) = H(m|K)$  Equation 4 c. $MAC(K,m) = H(K|m|K)$  Equation 5

Referring again to FIG. 1, the processor includes a decode unit or decoder 102. The decode unit may receive and decode the keyed-hash MAC with obfuscated key information instruction 101. The decode unit may output one or more relatively lower-level instructions or control signals (e.g., one or more microinstructions, micro-operations, micro-code entry points, decoded instructions or control signals, etc.), which reflect, represent, and/or are derived from the relatively higher-level keyed-hash MAC with obfuscated key information instruction. In some embodiments, the decode unit may include one or more input structures (e.g., port(s), interconnect(s), an interface) to receive the instruction, an instruction recognition and decode logic coupled therewith to recognize and decode the instruction, and one or more output structures (e.g., port(s), interconnect(s), an interface) coupled therewith to output the lower-level instruction(s) or control signal(s). The decode unit may be implemented using various different mechanisms including, but not limited to, microcode read only memories (ROMs), look-up tables, hardware implementations, programmable logic arrays (PLAs), and other mechanisms suitable to implement decode units.

In some embodiments, instead of the keyed-hash MAC with obfuscated key information instruction being provided directly to the decode unit, an instruction emulator, translator, morpher, interpreter, or other instruction conversion module may optionally be used. Various types of instruction conversion modules may be implemented in software, hardware, firmware, or a combination thereof. In some embodiments, the instruction conversion module may be located outside the processor, such as, for example, on a separate die and/or in a memory (e.g., as a static, dynamic, or runtime emulation module). By way of example, the instruction conversion module may receive the keyed-hash MAC with obfuscated key information instruction, which may be of a first instruction set, and may emulate, translate, morph, interpret, or otherwise convert the keyed-hash MAC with obfuscated key information instruction into one or more corresponding intermediate instructions or control signals, which may be of a second different instruction set. The one or more intermediate instructions or control signals of the second instruction set may be provided to a decode unit (e.g., decode unit 102), which may decode them into one or more lower-level instructions or control signals executable by native hardware of the processor (e.g., one or more execution units).

In some embodiments, the keyed-hash MAC with obfuscated key information instruction 101 may explicitly specify (e.g., through one or more fields or a set of bits), or otherwise indicate (e.g., implicitly indicate), data often referred to as a message 112, obfuscated key information 111, and a destination storage location (e.g., a packed data register 113) where a message authentication code (MAC) 114 is to be stored responsive to and/or as a result of the instruction. As one example, the instruction may have source and/or destination operand specification fields to specify registers, memory locations, or other storage locations that may have these operands, or may store data to indicate these operands. Alternatively, one or more of these operands may optionally be implicit to the instruction (e.g., a storage location may be implicit to an opcode of the instruction).

As shown, in some embodiments, the processor 100 during deployment and/or use may be operative to be coupled with, or otherwise in communication with, a memory 110. As shown, in some embodiments, the message 112 may optionally be stored at a location in the memory, and the obfuscated key information 111 may optionally be stored at one or more locations in the memory. In some embodiments, the keyed-hash MAC with obfuscated key information instruction may specify or otherwise indicate a first general-purpose register of a set of general-purpose registers 107 that may optionally have an indication of the message (e.g., an effective address, pointer, or other indication of a memory location where the message is stored). In some embodiments, the keyed-hash MAC with obfuscated key information instruction may specify or otherwise indicate a second general-purpose register of that may optionally have an indication of the obfuscated key information (e.g., an effective address, pointer, or other indication of a memory location where the obfuscated key information is stored). Alternatively, the message and/or the obfuscated key information may optionally be stored in registers, a dedicated stream buffer of the processor, one or more caches of the structure, or other storage locations. As shown, in some embodiments, the destination storage location may optionally be a packed data register 113 in a set of packed data registers. Alternatively, other registers, a location in the memory 110, or anther storage location may optionally be used for the destination storage location. Moreover, in some embodiments, a storage location used for the message and/or the obfuscated key information may optionally be reused as the destination storage location for the MAC.

The general-purpose registers 107, and the packed data register 113, may represent on-die storage locations that are operative to store data. The general-purpose registers are generally used to store scalar data, whereas the packed data register is used to store packed data, vector data, or Single instruction, multiple data (SIMD) data. The registers may represent architecturally-visible or architectural registers that are visible to software and/or a programmer and/or are the registers indicated by instructions of the instruction set of the processor to identify operands. These architectural registers are contrasted to other non-architectural registers in a given microarchitecture (e.g., temporary registers, reorder buffers, retirement registers, etc.). The packed data registers may be implemented in different ways in different microarchitectures and are not limited to any particular type of design. Examples of suitable types of registers include, but are not limited to, dedicated physical registers, dynamically allocated physical registers using register renaming, and combinations thereof.

The message 112 is to be interpreted broadly as various different types of data on which the keyed-hash MAC algorithm is to be performed. Although it is referred to as a message, it need not be any type of communication message but rather may be any arbitrary type of data. In some embodiments, the message may be a variable length message. Commonly, the variable length message may have a length ranging from a tenth of a kilobyte to a few kilobytes, although the scope of the invention is not so limited. In some embodiments, the instruction may optionally specify or otherwise indicate a length of the variable-length message. For example, the instruction may have an immediate or other field to indicate the number of blocks (or bytes or bits) in the message. Alternatively, a fixed length message (e.g., a fixed number of message blocks) may optionally be implicit to the instruction (e.g., implicit to the instructions opcode). In one aspect, the message may potentially/optionally have been received from a network interface, a communication device, or other unreliable medium, although the scope of the invention is not so limited.

In some embodiments, the obfuscated key information 111 may help to provide secrecy, confidentiality, or protection to key information that is to be used in the keyed-hash MAC to generate the MAC 114. The obfuscated key information is not itself the key information on which the MAC is based. That is, the MAC may not be consistent with the keyed-hash MAC algorithm if evaluated with the indicated message and the obfuscated key information. In some embodiments, the obfuscated key information may represent any of a wide variety of different types of information, from which the key information (on which the MAC 114 is based), cannot, except with extreme difficulty, or perhaps even feasibly, be determined, if a secret (e.g., secret 104), which is available to the processor, but not accessible to or at least not readable by software (e.g., even an operating system, a virtual machine monitor, or other privileged-level system software), is not known. However, the key information (on which the MAC 114 is based), may be readily determined from the obfuscated key information if the secret (e.g., secret 104) is known. By using obfuscated key information as input, instead of the key information itself, software (e.g., even malicious or corrupted privileged-level system software) may not be able to derive or determine the key information that is to be used in the keyed-hash MAC to generate the MAC. The entire conversion of the obfuscated key information into the key information that is to be used in the keyed-hash MAC to generate the MAC may be performed entirely within the confines of the internals of the processor and may never be visible to software. The keyed-hash MAC instruction with obfuscated key information instruction may be used to perform a "key locked" keyed-hash MAC in which the key information used for the MAC is architecturally never visible to software or a programmer. Advantageously, this may help to allow ultra-secure keyed-hash MAC operations. This may tend to be especially evaluable in usages where the secret key is extremely valuable (e.g., more valuable than the data being protected in a single session).

Referring again to FIG. 1, an execution unit 103 is coupled with the decode unit 102, the general-purpose registers 107, and the packed data register 113. The execution unit may receive the one or more decoded or otherwise converted instructions or control signals that represent and/or are derived from the keyed-hash MAC instruction 101. The execution unit may also receive the message 112 and the obfuscated key information 111 that is to represent at least one of key information and key indication information. The execution unit is operative in response to and/or as a result of the keyed-hash MAC instruction (e.g., in response to one or more instructions or control signals decoded from the instruction) to store a message authentication code (MAC) 114 corresponding to the indicated message 112 in the destination storage location (e.g., a packed data register 113) indicated by the instruction. The MAC may represent a result of the instruction. In some embodiments, the instruction may optionally specify or otherwise indicate a length to be used for the MAC, and the execution unit may truncate the MAC to the specified or otherwise indicated length. For example, the instruction may optionally have an immediate or other field to provide a value to indicate the length of the MAC. Alternatively, a fixed length MAC (e.g., as used by the underlying hash algorithm) may optionally be used.

The execution unit includes a secret 104, a key information deobfuscation unit 105 coupled with the secret, and a keyed-hash MAC unit 106 coupled with the key information deobfuscation unit. The secret may be available to the processor, but not accessible to software (e.g., even an operating system, a virtual machine monitor, or other privileged-level system software). The secret 104 is to be interpreted broadly herein as any of a wide variety of different types of information, logic, or a combination of information and logic, from which the key information (on which the MAC 114 is based) can be determined from the obfuscated key information. Examples of possible secrets include, but are not limited to, cryptographic keys or key information stored secretly on-die and not accessible to software, cryptographic keys or key information generated secretly on-die during runtime and not accessible to software, secret information stored on-die and not accessible to software, secret information generated on-die during runtime and not accessible to software, secret on-die cryptographic, mathematical, or other transformation logic, and the like, and various combinations thereof. The secret may not be accessible or at least not readable by software. In some embodiments, the secret may represent information that earlier software stored into the processor by that later software is not able to read, although the scope of the invention is not so limited. The key information deobfuscation unit 105 may be operative to use the secret and the obfuscated key information to determine the key information and may provide the key information to the keyed-hash MAC unit. The keyed-has MAC unit 106 may be operative to generate the MAC 114 from the key information and the message 112.

The keyed-hash MAC unit 106 may use any of various different iterated cryptographic hash algorithms. Examples of suitable cryptographic hash algorithms include, but are not limited to, an MD5 Message-Digest Algorithm, an SHA-1 secure hash algorithm, a SHA-2 secure hash algorithm, and a RACE Integrity Primitives Evaluation Message Digest (RIPEMD) cryptographic hash algorithm. The SHA-2 secure hash algorithm may be any one of the six hash functions SHA-224 with a 224-bit hash value, SHA-256 with a 256-bit hash value, SHA-384 with a 384-bit hash value, or SHA-512 with a 512-bit hash value, SHA-512/224 with a 512-bit or 224-bit hash value, and SHA-512/256 with a 512-bit or 256-bit hash value. SHA1 and MD5 are used in the IPsec and TLS protocols. In some embodiments, an opcode of the instruction 101 may optionally be agnostic to multiple cryptographic hash algorithms (e.g., any combination of the aforementioned hash algorithms), and the instruction 101 may optionally have a field to indicate or select one of multiple support cryptographic hash algorithms to be used.

In some embodiments, the MAC 114 may be generated based on the entire message 112 within the confines of the performance of the same single keyed-hash MAC with obfuscated key information instruction 101. For example, a message with a size optionally ranging from a few tenths of a kilobyte to on the order of tens of kilobytes may be processed with the same single instruction, instead of needing to use many such instructions to process smaller 128-bit, 256-bit, or 512-bit register-sized portions of the message each with a different instruction. One potential advantage is that this may help to avoid exposing cryptographically processed portions or intermediate results, which could potentially be analyzed to reveal the message and/or the cryptographic key. Rather, in some embodiments, all such intermediate results may be held within the keyed-hash MAC unit 106 and/or otherwise within the execution unit 103, instead of being stored in architecturally visible registers (e.g., the registers 107 and/or 113).

The execution unit and/or the processor may include specific or particular logic (e.g., transistors, integrated circuitry, or other hardware potentially combined with firmware (e.g., instructions stored in non-volatile memory) and/or software) that is operative to perform the keyed-hash MAC instruction and/or store the MAC in response to and/or as a result of the keyed-hash MAC instruction (e.g., in response to one or more instructions or control signals decoded from the keyed-hash MAC instruction). By way of example, the execution unit may include a cryptographic unit, a digital circuit to perform cryptographic operations, or the like. By way of example, the execution unit may include a microcode engine, state machine, or the like, to perform the operations of the keyed-hash MAC algorithm (e.g., chain the state between different applications of the hash algorithm on different message blocks, etc.). In some embodiments, the execution unit may include one or more input structures (e.g., port(s), interconnect(s), an interface) to receive the message and at least one value, circuitry or logic coupled therewith to receive and process the message and the at least one value and generate the MAC, and one or more output structures (e.g., port(s), interconnect(s), an interface) coupled therewith to output the MAC.

To avoid obscuring the description, a relatively simple processor has been shown and described. However, the processor may optionally include other processor components. For example, various different embodiments may include various different combinations and configurations of the components shown and described for any of FIGS. 9-11. All of the components of the processor may be coupled together to allow them to operate as intended.

Figure 2:
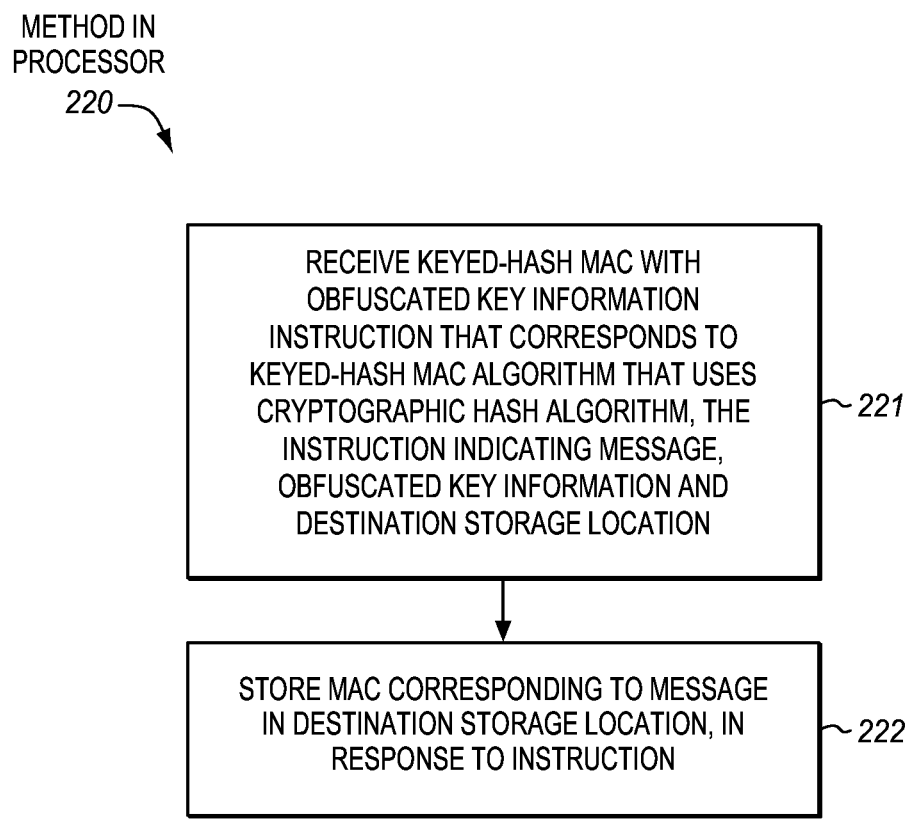
FIG. 2 is a block flow diagram of an embodiment of a method of performing an embodiment of a keyed-hash MAC with obfuscated key information instruction.

FIG. 2 is a block flow diagram of an embodiment of a method 220 of performing an embodiment of a keyed-hash MAC with obfuscated key information instruction. In various embodiments, the method may be performed by a processor, instruction processing apparatus, or other digital logic device. In some embodiments, the method 220 may be performed by and/or within the processor 100 of FIG. 1. The components, features, and specific optional details described herein for the processor 100, also optionally apply to the method 220. Alternatively, the method 220 may be performed by and/or within a different processor or apparatus. Moreover, the processor 100 may perform different methods than the method 220.

The method includes receiving the keyed-hash MAC with obfuscated key information instruction, at block 221. The instruction may correspond to, and be used to implement, a keyed-hash MAC algorithm that uses a cryptographic hash algorithm. In various aspects, the instruction may be received at a processor or a portion thereof (e.g., an instruction fetch unit, a decode unit, a bus interface unit, etc.). In various aspects, the instruction may be received from an off-processor and/or off-die source (e.g., from memory, interconnect, etc.), or from an on-processor and/or on-die source (e.g., from an instruction cache, instruction queue, etc.). The keyed-hash MAC instruction may specify or otherwise indicate a message, obfuscated key information, and a destination storage location.

A message authentication code (MAC) corresponding to the indicated message is stored in the indicated destination storage location in response to and/or as a result of the keyed-hash MAC with obfuscated key information instruction, at block 222. In some embodiments, the obfuscated key information may be such that key information (on which the MAC is based) cannot except with extreme difficulty or even feasibly be determined if a secret (e.g., which is available to the processor but not accessible to software) is not known. In some embodiments, the obfuscated key information may include or consist of an encryption of cryptographic key information (e.g., an encrypted key that is to be used for the keyed-hash MAC algorithm). In other embodiments, the obfuscated key information may include or consist of a key information indication value or information. For example, the key information indication value may be an index or identifier of a key that is to be used for the keyed-hash MAC algorithm.

The illustrated method involves architectural operations (e.g., those visible from a software perspective). In other embodiments, the method may optionally include one or more microarchitectural operations. By way of example, the instruction may be fetched, decoded, scheduled out-of-order, source operands may be accessed, an execution unit may perform microarchitectural operations to implement the instruction, etc. In some embodiments, the microarchitectural operations to implement the instruction may optionally include any of those shown and described for any of FIGS. 3-7, including the variations mentioned therefor.

Figure 3:
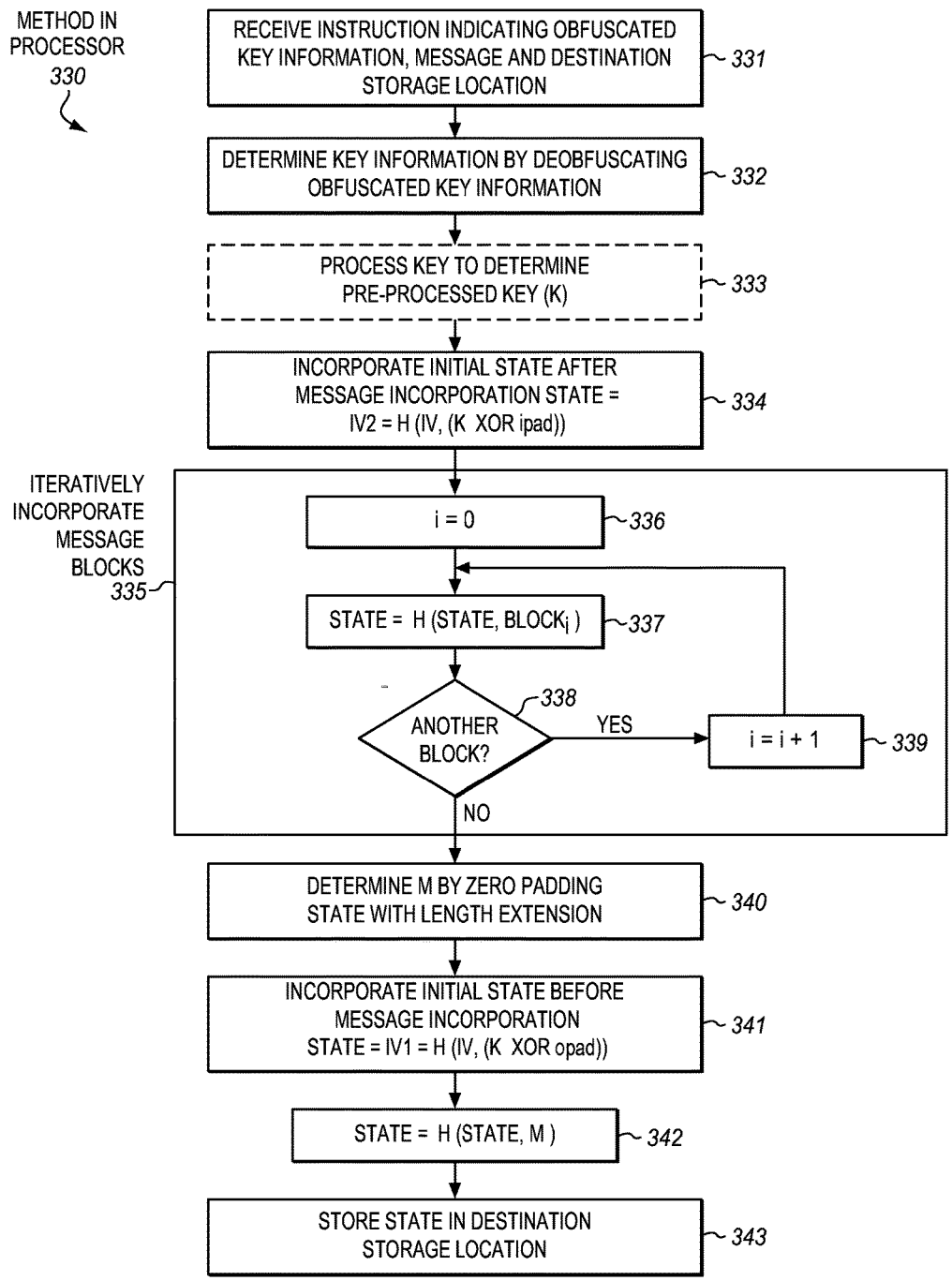
FIG. 3 is a block flow diagram of an example embodiment of a detailed method of performing an embodiment of a keyed-hash MAC with obfuscated key information instruction.

FIG. 3 is a block flow diagram of an example embodiment of a detailed method 330 of performing an embodiment of a keyed-hash MAC with obfuscated key information instruction. In various embodiments, the method may be performed by a processor, instruction processing apparatus, or other digital logic device. In some embodiments, the method 330 may be performed by and/or within the processor 100 of FIG. 1. The components, features, and specific optional details described herein for the processor 100, also optionally apply to the method 330. Alternatively, the method 330 may be performed by and/or within a different processor or apparatus. Moreover, the processor 100 may perform different methods than the method 330.

The method includes receiving the keyed-hash MAC with obfuscated key information instruction, at block 331. The instruction may specify or otherwise indicate obfuscated key information, a message, and a destination storage location.

Then, at block 332, key information may be determined by deobfuscating the obfuscated key information indicated by the instruction. In some embodiments, this may include using a secret of the processor, which is available to the processor, but not accessible to software. For example, in some embodiments, this may include using a secret cryptographic key of the processor, which is completely hidden from software, to decrypt the obfuscated key information, which may be an encryption of key information. As another example, in some embodiments, this may include using the obfuscated key information to look up secret key information that is stored or generated on-die and completely hidden from software. Alternatively, various other approaches disclosed herein may optionally be used.

At block 333, in some embodiments, if the deobfuscated key information is a deobfuscated cryptographic key on which the MAC is to be based, then the deobfuscated key may be processed to determine a preprocessed key (K) that is to be used in the keyed-hash MAC algorithm. For example, if the length of the deobfuscated key is less than the block size (B) of the input to the cryptographic hash algorithm, then the deobfuscated key may be zero extended to the block size (B) to obtain the preprocessed key (K). Or, if the length of the deobfuscated key is greater than the block size (B), then the deobfuscated key may first be hashed to a shorter length, and then zero extended to the block size (B) to obtain the preprocessed key (K). Or, if the length of the deobfuscated key is equal to the block size (B), then no such processing may be needed and the deobfuscated key may be used directly as the preprocessed key (K). In an alternate embodiment, there may be no need for such processing of the deobfuscated key to obtain the preprocessed key (K). For example, this may optionally be done previously (e.g., the already preprocessed key may be encrypted and then decrypted as part of the deobfuscation at block 332. As another example, this is typically not needed if the deobfuscation at block 332 yields IV1 and IV2 evaluations, as will be explained further below. Accordingly, the processing at block 333 is optional, not required.

At block 334, an incorporation of an evaluation of a first initial state cryptographic hash (IV1) involving an initial state (IV), the key (K), and an inner pad value (ipad), may be performed, before starting to incorporate blocks of the message. The keyed-hash MAC algorithm may have an initial state (IV). For example, the initial state (IV) may be constants that depend upon the particular algorithm. An exclusive logical OR (XOR) may be performed on the key (K) and an inner pad value (ipad). The ipad may depend upon the particular algorithm. In the case of the HMAC algorithm, the ipad may be the byte x'36' repeated the block size (B) times (e.g., a 0x363636 . . . 3636 one block long hexadecimal constant). The cryptographic hash algorithm (H) may be evaluated with the initial state (IV) and the key (K) XOR'd with the ipad to obtain the first initial state cryptographic hash (IV1). This represents a starting state (state). IV1 may represent an evaluation of an intermediate portion of the keyed-hash MAC algorithm that involves the cryptographic key (K).

At block 335, the method may iteratively incorporate blocks of the message. The keyed-hash MAC algorithm uses an iterative approach in which a message is divided into a series of equal sized blocks, and the blocks are operated on or compressed in sequence using a one way compression function of the cryptographic hash algorithm. The size of the message blocks may vary from one cryptographic hash algorithm to another. By way of example, MD5 and SHA-1 operate on 512-bit sized blocks. This may potentially be used to allow optionally variable length messages to be processed.

At block 336, a message block counter (i) is initialized to zero. At block 337, the state is updated to include the cryptographic hash algorithm (H) evaluated with the prior state and the message block for the current block counter (i). Each invocation of the cryptographic hash algorithm (H) may perform the hash computations for one block. For example, in the case of SHA-1 it may compute eighty (80) rounds. At block 338, a determination is made whether or not there is another message block to incorporate. If there is another message block to incorporate (i.e., "yes" is the determination), then the method may advance to block 339 where the block counter (i) may be incremented and then the method may revisit block 337. Alternatively, if there is not another message block to incorporate (i.e., "no" is the determination), then the method may advance to block 340.

At block 340, a zero padded state value (M) may be determined by padding the resulting state from block 338 based on the incorporation of the last message block with length extension. This may help to provide additional security.

At block 341, an incorporation of an evaluation of a second cryptographic hash (IV2) involving the initial state (IV), the key (K), and an outer pad value (opad), may be performed, after incorporating all of the blocks of the message. An XOR may be performed on the key (K) and the outer pad value (opad). The opad may depend upon the particular algorithm. In the case of the HMAC algorithm, the opad may be the byte x'5c' repeated the block size (B) times (e.g., a 0x5c5c5c . . . 5c5c one block long hexadecimal constant). The cryptographic hash algorithm (H) may be evaluated with the initial state (IV) and the key (K) XOR'd with the opad to obtain a second initial state cryptographic hash (IV2). This represents a finishing state (state). IV2 may represent a second evaluation of an intermediate portion of the keyed-hash MAC algorithm that involves the cryptographic key (K).

At block 342, the cryptographic hash may be evaluated with the second initial state cryptographic hash (IV2) and the zero padded state value (M) to yield a final state (state). This final state represents the result of the keyed-hash MAC algorithm or the MAC itself.

At block 343, the MAC may be stored in the destination storage location. The size of the final MAC may be the same as that of the underlying cryptographic hash algorithm. For example, the MAC may be 128-bits in the case of MD5, or 160-bits in the case of SHA-1. Alternatively, the MAC may optionally be truncated in some embodiments, if desired. In some embodiments, the instruction may optionally indicate a length to which the MAC is to be truncated.

Figure 4:
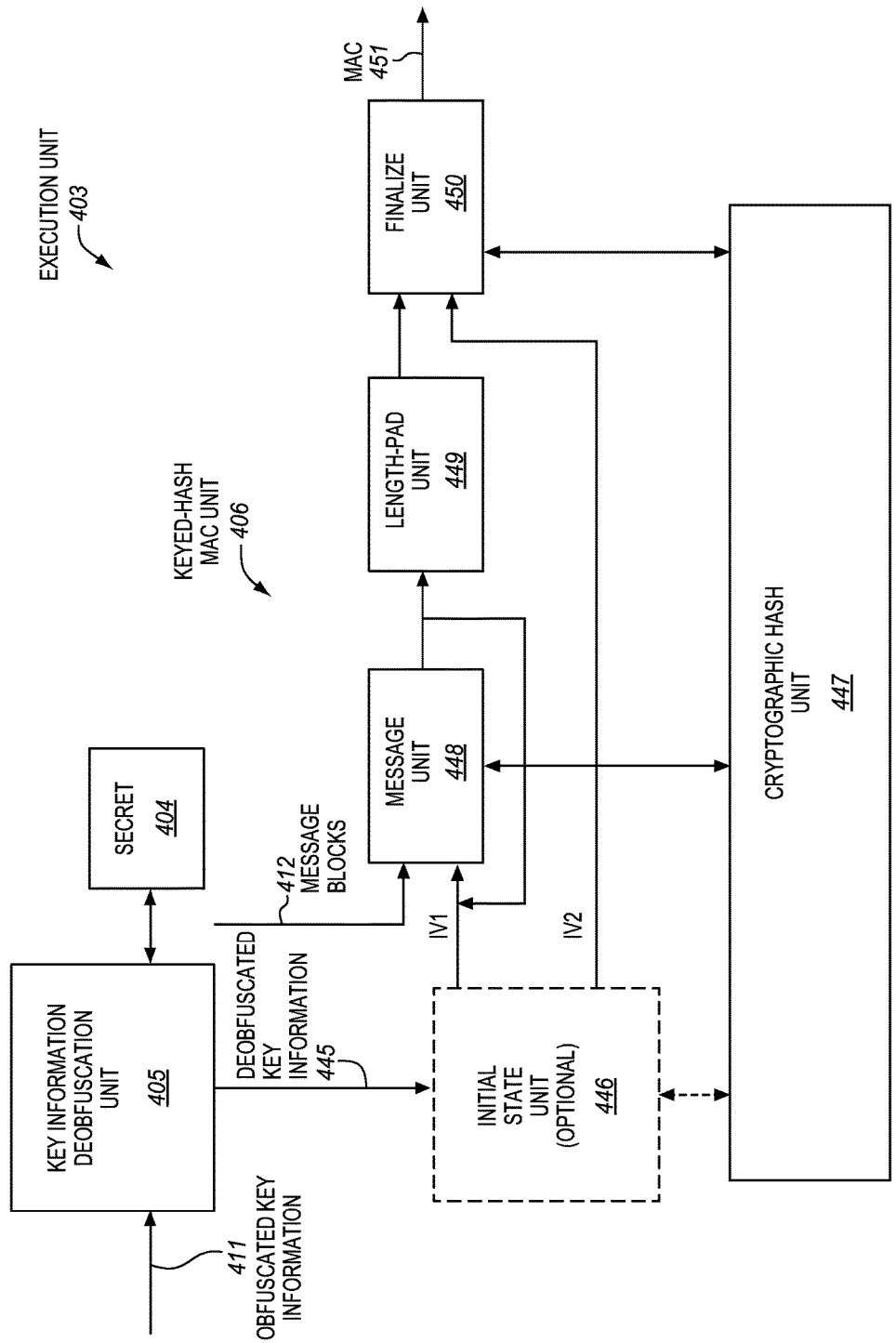
FIG. 4 is a block diagram of a more detailed example embodiment of an execution unit to perform a keyed-hash MAC with obfuscated key instruction.

FIG. 4 is a block diagram of a more detailed example embodiment of an execution unit 403 to perform a keyed-hash MAC with obfuscated key instruction. The execution unit includes a key information deobfuscation unit 405 and a secret 404. The secret is available to the execution unit and/or a processor in which the execution unis is included, but is not accessible to software. The key information deobfuscation unit may receive obfuscated key information 411 indicated by the instruction, and may deobfuscate it to obtain deobfuscated key information 445. By way of example, the deobfuscation unit may optionally perform block 332 of FIG. 3, although the scope of the invention is not so limited. The execution unit also includes a keyed-hash MAC unit 406 that includes an optional initial state unit 446, a message unit 448, a length pad unit 449, a finalize unit 450, and a cryptographic hash unit 447.

The optional initial state unit 446 is coupled with the key information deobfuscation unit and may receive the deobfuscated key information 445. The initial state unit is also coupled with a cryptographic hash unit 447. The initial state unit has an initial state (IV) for the keyed-hash MAC algorithm. For example, the initial state (IV) may optionally be stored in internal microarchitectural registers. As another example, the instruction may optionally specify or otherwise indicate a storage location (e.g., an architectural register or memory location) where the initial state is stored. The initial state unit may provide the key information and the initial state (IV) to the cryptographic hash unit. The cryptographic hash unit may responsively provide a first initial state cryptographic hash (IV1) involving an initial state (IV), the key (K), and an inner pad value, and a second initial state cryptographic hash (IV2) involving the initial state (IV), the key (K), and an outer pad value. By way of example, the initial state unit and the cryptographic hash unit may optionally together perform blocks 334 and 341 of FIG. 3, although the scope of the invention is not so limited. Alternatively, as will be explained below, the first and second initial state cryptographic hashes (IV1, IV2) may optionally be provided via the deobfuscated key information 445, in which case the initial state unit 446 may optionally be omitted.

The execution unit also includes a message unit 448. The first initial state cryptographic hash (IV1) may be provided to the message unit. Message blocks 412 may also be input to the message unit. The message unit is coupled with the cryptographic hash unit. The message unit may provide a current state, for example after the first evaluation recirculated from its output to its input, and a current message block, to the cryptographic hash unit. The cryptographic hash unit may provide back a resulting updated state which is based on a hash performed on the current state and current message block. The message unit may similarly incorporate or compress all message blocks in this way. By way of example, the message unit and the cryptographic hash unit may optionally together perform block 335 of FIG. 3, although the scope of the invention is not so limited.

A length pad unit 449 is coupled with an output of the message unit 448. The length pad unit may zero pad the state resulting from the last message block being incorporated with length extension. This may help to provide additional security. By way of example, the length pad unit may optionally perform block 340 of FIG. 3, although the scope of the invention is not so limited.

A finalization unit 450 is coupled with an output of the length pad unit 449. The finalize unit is coupled with the initial state unit or otherwise operative to receive the second initial state cryptographic hash (IV2). The finalization unit is also coupled with the cryptographic hash unit. The finalization unit may provide the second initial state cryptographic hash (IV2), and the zero padded length extended state received from the length pad unit, to the cryptographic hash unit. The cryptographic hash unit may perform a cryptographic hash thereon and return a final state. By way of example, the finalize unit and the cryptographic hash unit may optionally together perform block 342 of FIG. 3, although the scope of the invention is not so limited. The final state may either optionally be truncated or not truncated and stored to a destination storage location as a MAC 451.

Figure 5:
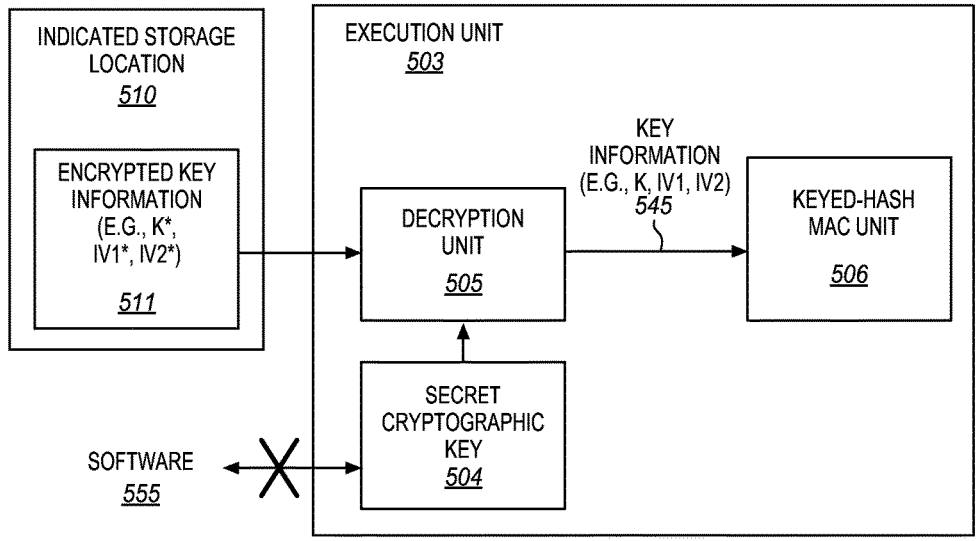
FIG. 5 is a block diagram of an embodiment of an execution unit that is operative to determine key information from encrypted key information responsive to a keyed-hash MAC with encrypted key information instruction.

FIG. 5 is a block diagram of an embodiment of an execution unit 503 that is operative to determine key information 545 from encrypted key information 511 responsive to a keyed-hash MAC with encrypted key information instruction. The encrypted key information is an example of obfuscated key information. The encrypted key information is stored in a storage location 510 (e.g., a register or memory location) that may be specified or otherwise indicated by the instruction. The execution unit includes a decryption unit 505. The execution unit and/or the decryption unit may be coupled to receive the encrypted key information. The decryption unit and/or the execution unit may also be coupled to receive a secret cryptographic key 504. The secret cryptographic key is accessible and available to the decryption unit and/or the execution unit, but is not accessible or available or at least not readable to software 555 (e.g., privileged-level system software). In some embodiments, the secret cryptographic key may have been written or stored into the processor but later software 555 may not be able to read it. In the illustrated embodiment, the secret cryptographic key is part of the execution unit. In other embodiments, the secret cryptographic key may instead be separate from the execution unit, but coupled with the execution unit and/or the decryption unit. The decryption unit may receive the secret cryptographic key and may be operative to use the secret cryptographic key to decrypt the encrypted key information into the decrypted key information 545. Various different decryption algorithms known in the art are suitable, such as, for example, Advanced Encryption Standard (AES), Data Encryption Standard (DES), triple DES (3DES), Rivest Cipher 4 (RC4), and other block/stream ciphers. A keyed-hash MAC unit 506 is coupled with the decryption unit, and may receive the decrypted key information. The keyed-hash MAC unit may use the decrypted key information to compute a MAC for a message, as described elsewhere herein. The MAC may be consistent with the key information but not with the encrypted key information. Advantageously, the key information 545 may be generated by the execution unit and/or its processor responsive to the instruction, but the key information may never be resident in an architectural register of the processor, or a memory location, or any other architecturally visible storage location, such that it may never be available or accessible to the software 555. Rather, the software may be able to see the encrypted key information 511, but it may be extremely difficult if not infeasible for the software to determine the key information 545 from the encrypted key information due to the safeguards that the encryption provides.

Different types of encrypted key information are suitable for different embodiments. In some embodiments, the encrypted key information may include an encryption of a cryptographic key that is to be used in the keyed-hash MAC algorithm to compute the MAC.

One specific example embodiment of a suitable keyed-hash MAC with encrypted cryptographic key instruction, named HMAC_LOCKED_K, is illustrated in the pseudocode below. This instruction may generate MACs consistent with FIPS-198-1, or a future version thereof.

```
HMAC_LOCKED_K{
// inputs
Src1 r64 // register storing pointer to memory location having encrypted key
Src2 r64 // register storing pointer to memory location having message m
Src3 r64 // register storing message length in blocks
// output
Dst r512 // packed data register to store MAC
K = decrypt_with_processor_key(src1) // optionally raise fault if decryption fails
State = H(IV, (K XOR ipad)); // calculate IV1
For(i=0; i< Src3; i++)
state = H(state, Src2[i]);
M = pad(state); // make a single 0-padded block with length extension
State = H(IV, (K XOR opad)); // calculate IV2
State = H(state, M);
Return Dst = state; // optionally truncate the MAC value
}
```

The HMAC_LOCKED_K instruction may explicitly specify or implicitly indicate a first 64-bit general-purpose register (r64) that is to store an effective address, pointer, or other indication of a location in memory that is to store a first source operand (SRC1), which is to be an encrypted key. Alternatively, another the encrypted key may optionally be stored in a specified or indicated packed data register or other storage location.

The instruction may also explicitly specify or implicitly indicate a second 64-bit general-purpose register (r64) that is to store an effective address, pointer, or other indication of a location in memory that is to store a second source operand (SRC2), which is to be a message (m). Alternatively, the location of the message may be indicated differently.

The instruction may also explicitly specify or implicitly indicate a third 64-bit general-purpose register (r64) that is to store a third source operand (SRC3), which is to specify or otherwise indicate a length of the message. In some embodiments, the length of the message may be indicated as a number of blocks. Alternatively, bytes, bits, or other granularities may optionally be used. In other embodiments, the length of the message may optionally be provided in a different sized register, or an immediate or other field of the instruction may optionally be used to indicate the length of the message. In still other embodiments, a fixed length may optionally be implicit (e.g., to an opcode of the instruction), instead of the length being flexible or variable.

The instruction may also explicitly specify or implicitly indicate a packed data register (r512) that is to correspond to a destination storage location (Dst) where a result MAC is to be stored. In the illustrated pseudocode, a 512-bit packed data register (r512) is used, although other sized packed data registers may alternatively be used (e.g., 128-bit, 256-bit, etc.). If the hash does not fit in one register, then two or more registers may optionally be used in combination. As another option, the destination storage location may be a memory location.

When the instruction is performed, the first, second, and third source operands may be received by an execution unit. The execution unit may decrypt the encrypted key with a secret or confidential key ("processor_key") to obtain a key (K) that is to be used for the keyed-hash MAC algorithm. The secret or confidential key ("processor_key") may be available to the processor, but may not be available or accessible to software. In some embodiments, a fault may optionally be raised if the processor is unable to properly decrypt or determine an authenticatable key (K).

The execution unit may then compute a state (State) by performing operations consistent with a cryptographic hash algorithm (H) to generate a hash value on an initial state (IV), and the decrypted key (K) XOR'd with an inner pad (ipad). Representatively, the ipad may be the byte x'36' repeated a block size (in bytes) of the input to the hash function times. In various different embodiments, the hash algorithm may be any one of MD5, SHA-1, SHA-2, RIPEMD, or another suitable hash algorithm for HMAC.

The execution unit may then perform a loop over each block of the message (e.g., according to the indicated length of the message in the third source operand). In the pseudocode "i" represents a loop counter for the current message block. In each loop, the execution unit may compute an updated state (e.g., based on message block i) by performing operations of the cryptographic hash algorithm (H) to generate a hash value based on a prior state (e.g., for loop i−1), and the current block (e.g., message block i).

After all blocks of the message have been incorporated into the running hash value, the execution unit may generate a padded state (M) by padding the resulting state after incorporation of the last message block in the message. For example, the execution unit may make a single zero-padded block with length extension.

The execution unit may compute a state (State) by performing operations of a hash algorithm (H) to generate a hash value on the initial state (IV), and the decrypted key (K) XOR'd with an outer pad (opad). Representatively, the opad may be the byte x'5c' repeated a block size (in bytes) of the input to the hash function times.

The execution unit may compute a final state (State) by performing operations of a hash algorithm (H) to generate a final hash value on state resulting from the hash with the outer pad (opad) with the padded state (M). In some embodiments, the execution unit may optionally truncate the final hash value. The execution unit may store the optionally truncated final has value as an HMAC value or MAC value in the destination storage location (Dst).

One possible advantage of encrypting the cryptographic key is that the total amount of encrypted data is generally fairly small. For example, often the encryption of the cryptographic key may be on the order of 128-bits to 256-bits. This may help to allow less bus bandwidth utilization if the encrypted cryptographic key is in memory, smaller registers to be used if the encrypted cryptographic key is stored in processor registers, etc.

In other embodiments, an encryption of an already evaluated portion of the keyed-hash MAC algorithm involving the cryptographic key on which the MAC is to be based may optionally be used. For example, in some embodiments, an encryption of at least one of the previously mentioned IV1 and/or IV2 may optionally be used as an input to a keyed-hash MAC with encrypted key information instruction. Recall that IV1 is an evaluation of a first initial state cryptographic hash involving an initial state (IV), and the key (K) XOR'd with and an inner pad value (ipad). IV2 is an evaluation of a second initial state cryptographic hash involving the initial state (IV), and the key (K) XOR'd with an outer pad value (opad). FIG. 3 shows IV1 in block 334 and IV2 in block 341. The initial state (IV) and the key (K) may represent constants. Accordingly, the IV1 and IV2 may be precomputed once, and optionally/potentially reused multiple times. Advantageously, this may help to avoid needing to calculate IV1 and IV2 for each message processed by the keyed-hash MAC algorithm, and may therefore help to improve performance. This may tend to be especially useful when processing many small messages, where the evaluation of IV1 and IV2 would otherwise represent relatively larger percentages of the overall processing of the algorithm. Accordingly, in other embodiments, the encrypted key information may include an encryption of IV1 and/or an encryption of IV2 (e.g., an encryption of a concatenation of IV1 and IV2).

One specific example embodiment of a suitable keyed-hash MAC with encrypted IV1 and IV2 instruction, named HMAC_LOCKED_IVs, is illustrated in the pseudocode immediately below. This instruction may generate MACs consistent with FIPS-198-1, or a future version thereof.

```
HMAC_LOCKED_IVs{
// inputs
Src1 r64 // register storing pointer to memory location having encrypted
IV1 and IV2
Src2 r64 // register storing pointer to memory location having message m
Src3 r64 // register storing message length in blocks
// output
Dst r512 // packed data register to store MAC
IV1||IV2 = decrypt_with_processor_key(Src1) // optionally raise fault if
decryption fails
State = IV1; // no need to recalculate IV1 since it's precomputed
For(i=0; i< Src3; i++)
state = H(state, Src2[i]);
M = pad(state); // make a single 0-padded block with length extension
State = IV2; // no need to recalculate IV2 since it's precomputed
State = H(state, M);
Return Dst = state; // optionally truncate the MAC value
}
```

The HMAC_LOCKED_IVs instruction is similar to the HMAC_LOCKED_K instruction previously described. To avoid obscuring the description, the different or additional features will be described, without repeating all of the features that may optionally be the same. However, it is to be appreciated that the previous description of the HMAC_LOCKED_K instruction also applies to the HMAC_LOCKED_IVs instruction, including the variations and alternatives mentioned.

For the HMAC_LOCKED_IVs instruction, instead of the first source operand (SRC1) having an encrypted key, it may has an encrypted combination of IV1 and IV2. For example, IV1 and IV2 may be concatenated, in either order, and then encrypted. When the instruction is performed, the execution unit may decrypt the encrypted IV1 and IV2 with a secret or confidential key ("processor_key") to obtain IV1 and IV2. As shown, the starting state (State) may be equal to IV1. Advantageously, there may be no need to perform computations to compute IV1 (e.g., the evaluation of the cryptographic has and XOR were performed previously and so don't need to be performed again). Similarly, IV2 does not need to be recomputed. Rather, IV2 may be incorporated directly into a hash with the padded and length extended state (M).

Figure 6:
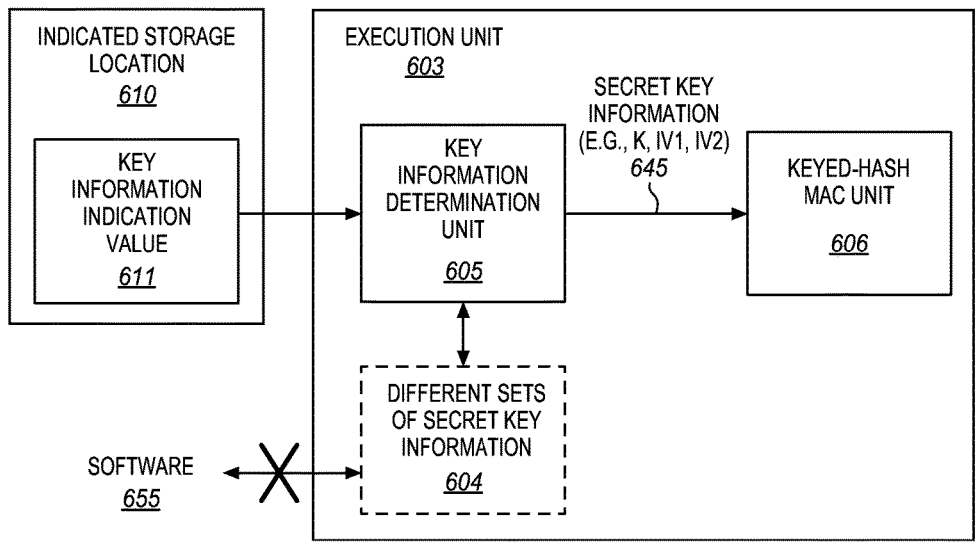
FIG. 6 is a block diagram of an embodiment of an execution unit that is operative to determine key information from a key information indication value responsive to a keyed-hash MAC with a key information indication value instruction.

FIG. 6 is a block diagram of an embodiment of an execution unit 603 that is operative to determine key information 645 from a key information indication value 611 responsive to a keyed-hash MAC with a key information indication value instruction. The key information indication value is an example of obfuscated key information. The key information indication value is stored in a storage location 610 (e.g., a register or memory location) that may be specified or otherwise indicated by the instruction. The execution unit includes a key information determination unit 605. The execution unit and/or the key information determination unit may be coupled to receive the key information indication value. The key information determination unit and/or the execution unit may also be coupled to different sets of secret key information 604. The different sets of secret key information represents a secret that is accessible and available to the key information determination unit and/or the execution unit, but is not accessible or available to software 655 (e.g., privileged-level system software). In various embodiments, the different sets of secret key information may include different cryptographic keys, different pairs of IV1 and IV2 based on different keys, or other different sets of key information. In the illustrated embodiment, the different sets of secret key information is part of the execution unit. In other embodiments, the different sets of secret key information may instead be separate from the execution unit, but coupled with the execution unit and/or the decryption unit.

The key information determination unit may be operative to use the key information indication value to obtain secret key information 645 from the different sets of secret key information 604. By way of example, the secret key information may include a cryptographic key, a pair of an IV1 and an IV2, or another evaluation involving key information. Different ways of using the key information indication value 611 to determine the secret key information 645 are contemplated. The key information indication value is to be interpreted broadly herein as any of a wide variety of different types of information that may be used to select, identify, or otherwise indicate key information.

In some embodiments, the key information indication value may not itself include any key information, or at least may include only a small enough subset of the key information that the level of security desired for the particular implementation is not compromised. In some embodiments, the different sets of secret key information 604 may be ordered in a list, table, array, or other ordered arrangement. The key information indication value may represent an index, offset, number, or other indicator to select or indicate a particular set of secret key information in the ordered arrangement.

In other embodiments, the key information indication value may be an identifier. The different sets of secret key information may not necessarily be arranged in any particular order. However, each of the different sets of secret key information may have a different corresponding unique identifier. For example, a first set may have an identifier "00000000," a second set may have an identifier "10111101," a third set may have an identifier "11110100," and so on. The identifier in the key information indication value may be matched to an identifier of a set of key information in order to select or indicate that key information. For example, the key information indication value may include the identifier "00000000" to indicate the first set of key information. These are just a few illustrative examples. Other ways of using a key information indication value to indicate one multiple sets of key information will be apparent to those skilled in the art and having the benefit of the present disclosure.

A keyed-hash MAC unit 606 is coupled with the key information determination unit 605, and may receive the secret key information 645. The keyed-hash MAC unit may use the secret key information to compute a MAC for a message, as described elsewhere herein. The MAC may be consistent with the secret key information but not with the key information indication value 611. Advantageously, the secret key information 645 may be generated by the execution unit and/or its processor responsive to the instruction, but the secret key information may never be available or accessible to the software 655.

Figure 7:
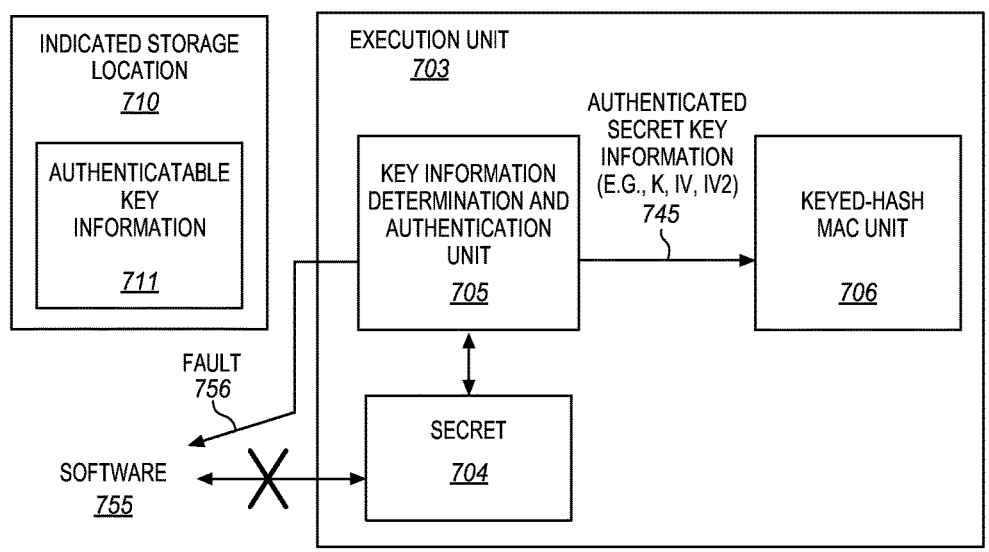
FIG. 7 is a block diagram of an embodiment of an execution unit that is operative to determine authenticated secret key information from authenticatable key information responsive to a keyed-hash MAC with authenticatable key information instruction.

FIG. 7 is a block diagram of an embodiment of an execution unit 703 that is operative to determine authenticated secret key information 745 from authenticatable key information 711 responsive to a keyed-hash MAC with authenticatable key information instruction. The authenticatable key information is an example of obfuscated and authenticatable key information. The authenticatable key information is stored in a storage location 710 (e.g., a register or memory location) that may be specified or otherwise indicated by the instruction. The execution unit includes a key information determination and authentication unit 605. The execution unit and/or the key information determination and authentication unit may be coupled to receive the authenticatable key information. The key information determination and authentication unit and/or the execution unit may also be coupled to a secret 704 that is accessible and available to the key information determination and authentication unit and/or the execution unit, but is not accessible or available to software 755 (e.g., privileged-level system software). In the illustrated embodiment, the different sets of secret key information is part of the execution unit. In other embodiments, the different sets of secret key information may instead be separate from the execution unit, but coupled with the execution unit and/or the decryption unit.

The key information determination and authentication unit may be operative to use the authenticatable key information to obtain authenticated secret key information 745. By way of example, the authenticated secret key information may include a cryptographic key, a pair of an IV1 and an IV2, or another evaluation involving key information. The key information determination and authentication unit may perform an integrity check on the authenticatable key information 711. In some embodiments, the authenticatable key information may include an encrypted and authenticatable version of key information (e.g., a key to be used for the MAC, an IV1 and IV2 based on the key to be used for the MAC, etc.). The authentication unit may be operative to decrypt and authenticate the authenticatable key information using the secret 704 which may include a secret or hidden cryptographic key. By way of example, the authenticatable key information may include extra authentication information (e.g., extra bits) in addition to the encrypted key information. The decryption unit may be operative to use these extra bits for authentication of the decrypted key to ensure it is authentic.

By way of example, in some embodiments, a processor in which the execution unit is included may have an encode key instruction in its instruction set. The encode key instruction may be performed with a key that is to be used for the keyed-hash MAC, or an IV1 and IV2 involving such a key. The processor may perform the encode key instruction to generate the authenticatable key information plus the additional authentication information. Alternatively, a key wrap algorithm may optionally be used to provide an encrypted and authenticatable key or set of one or more mathematical evaluations.

The authentication may fail if the generated actual key is not what is expected (e.g., the extra bits of authentication information indicate a lack of authenticity). In some embodiments, if an attempt to authenticate the authenticatable key information does not succeed, then the execution unit may signal a fault 756. For example, the fault may be delivered to the software (e.g., a fault handler of an operating system). In such a case, no output will be computed.

A keyed-hash MAC unit 706 is coupled with the key information determination and authentication unit 705, and may receive the authenticated secret key information 745. The keyed-hash MAC unit may use the authenticated secret key information to compute a MAC for a message, as described elsewhere herein. The MAC may be consistent with the authenticated secret key information but not with the authenticatable key information 711. Advantageously, the authenticated secret key information 745 may be generated by the execution unit and/or its processor responsive to the instruction, but the authenticatable key information may never be available or accessible to the software 755.

Performing a single keyed-hash MAC with obfuscated key information instruction may take a large number of processor clock cycles. For example, to process each block of the message may take on the order of around 100 cycles or more depending upon the particular algorithm and architecture in which it is implemented. In addition, messages can have potentially quite a few message blocks. Accordingly, there is a chance that the instruction may be interrupted before it completes. In the case of instructions with obfuscated key information, in some embodiments, at least one of several different approaches may optionally be used to help ensure that partial state, from which the actual key could be derived, does not become visible to software.

One possible approach is to encrypt the intermediate state associated with performance of the keyed-hash MAC instruction with a secret key of the processor that is not accessible to software and then save the encrypted intermediate state to a storage location. After the interruption has been resolved, the encrypted intermediate state may be retrieved, decrypted, and the algorithm may resume starting with the intermediate state. Another possible approach is to throw away or discard the intermediate state associated with performance of the keyed-hash MAC instruction. After the interruption is resolved, the keyed-hash MAC algorithm may start over without using intermediate state. Yet another possible approach if for the instruction to limit the message to a given number of message blocks. For example, one possible limit is on the order of several thousand (e.g., <5000) bytes, so that it becomes less likely that the message will get interrupted.

In other embodiments, it may not be desired for the particular implementation to protect key information. For example, the key may be a short lived key that is only used for a single message, or a few messages, and the messages may not be extremely important, etc. In such cases, there may be no need to obfuscate the key information. Other embodiments pertain to keyed-hash MAC instructions with key information that is not obfuscated. These instructions may be similar to the other instructions disclosed herein except that instead of indicating obfuscated key information they may indicate actual key information. The actual key information may be stored in a memory location or other storage location that is accessible to software. Examples of suitable key information includes the types of key information disclosed elsewhere herein, such as, for example, a cryptographic key that is to be used in the keyed-hash MAC algorithm, an IV1 and IV2 involving such a key, etc. There may be no need to decrypt or otherwise interpret the key information, since it is not obfuscated, but rather it can be used directly in they keyed-hash MAC algorithm.

One specific example embodiment of a suitable keyed-hash MAC with encrypted cryptographic key instruction, named HMAC_LOCKED_K, is illustrated in the pseudo-code below. This instruction may generate MACs consistent with FIPS-198-1, or a future version thereof.

```
HMAC_NOT_LOCKED_K{
// inputs
Src1 r64 // register storing pointer to memory location having key (K)
Src2 r64 // register storing pointer to memory location having message m
Src3 r64 // register storing message length in blocks
// output
Dst r512 // packed data register to store MAC
K= load (Src1) // no decryption or other deobfuscation needed
State = H(IV, (K XOR ipad)); // calculate IV1
For(i=0; i< Src3; i++)
state = H(state, Src2[i]);
M = pad(state); // make a single 0-padded block with length extension
State = H(IV, (K XOR opad)); // calculate IV2
State = H(state, M);
Return Dst = state; // optionally truncate the MAC value
}
```

The HMAC_NOT_LOCKED_K instruction is similar to the HMAC_LOCKED_K instruction previously described. To avoid obscuring the description, the different or additional features will be described, without repeating all of the features that may optionally be the same. However, it is to be appreciated that the previous description of the HMAC_LOCKED_K instruction also applies to the HMAC_NOT_LOCKED_K instruction, including the variations and alternatives mentioned, except for aspects pertaining to the key not being encrypted. In the HMAC_NOT_ LOCKED_K instruction the first source operand (Src1) has the actual cryptographic key that is to be used in the HMAC algorithm. It is not encrypted. There is no need to decrypt it. Another embodiment of a keyed-hash MAC instructions with key information that is not obfuscated is one that indicates a storage location having unencrypted IV1 and IV2 on which a result MAC is to be based and consistent.

FIG. 8 is a block diagram of an example embodiment of a keyed-hash MAC with obfuscated key information instruction 801. The instruction includes an operation code or opcode 860. The opcode may represent a plurality of bits, or one or more fields, that are operative to identify the instruction and/or the operation to be performed (e.g., an keyed-hash MAC operation). The instruction also includes a message indication field 808 to indicate a location of a message, an obfuscated key information indication field 809 to indicate a location of obfuscated key information, an optional destination storage location indication field 861 to indicate a destination storage location where a MAC is to be stored. By way of example, each of these fields may include bits to specify an address of a register, memory location, or other storage location for the associated operand. Alternatively, one or more of these storage locations may optionally be implicit or inherent to the instruction (e.g., the opcode), rather than being specified. As another example, in some embodiments, instead of the destination specification field, a storage location used for a message and/or obfuscated key information may optionally be implicitly reused for the destination operand. In some embodiments, the instruction may also optionally have a hash algorithm indication field 862 to indicate one of a plurality of different hash algorithms supported by the instruction and/or the opcode. In some embodiments, the instruction may also optionally have a number of blocks indication field 863 to indicate a number of blocks of the message. In some embodiments, the instruction may also optionally have a MAC length indication field 864 to indicate a length of the MAC that is to be stored (e.g., a length to which the MAC is to be truncated). The fields 862-864 are optional not required. Alternate embodiments may include a subset of the illustrated fields and/or may add additional fields. The illustrated arrangement of the fields is not required, rather the fields may be rearranged variously. Moreover, each of the fields may either consist of a contiguous set of bits, or may include non-contiguous or separated bits that logically represent the field.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-order and out-of-order Core Block Diagram

FIG. 9A is a block diagram illustrating both an exemplary in-order pipeline and an exemplary register renaming, out-of-order issue/execution pipeline according to embodiments of the invention. FIG. 9B is a block diagram illustrating both an exemplary embodiment of an in-order architecture core and an exemplary register renaming, out-of-order issue/execution architecture core to be included in a processor according to embodiments of the invention. The solid lined boxes in FIGS. 9A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 9A, a processor pipeline 900 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924.

FIG. 9B shows processor core 990 including a front end unit 930 coupled to an execution engine unit 950, and both are coupled to a memory unit 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front end unit 930 includes a branch prediction unit 932 coupled to an instruction cache unit 934, which is coupled to an instruction translation lookaside buffer (TLB) 936, which is coupled to an instruction fetch unit 938, which is coupled to a decode unit 940. The decode unit 940 (or decoder) may decode instructions, and generate as an output one or more micro-operations, micro-code entry points, microinstructions, other instructions, or other control signals, which are decoded from, or which otherwise reflect, or are derived from, the original instructions. The decode unit 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macroinstructions (e.g., in decode unit 940 or otherwise within the front end unit 930). The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s) 956 represents any number of different schedulers, including reservations stations, central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 958 comprises a vector registers unit, a write mask registers unit, and a scalar registers unit. These register units may provide architectural vector registers, vector mask registers, and general purpose registers. The physical register file(s) unit(s) 958 is overlapped by the retirement unit 954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 954 and the physical register file(s) unit(s) 958 are coupled to the execution cluster(s) 960. The execution cluster(s) 960 includes a set of one or more execution units 962 and a set of one or more memory access units 964. The execution units 962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 964). It should also be understood that where separate pipelines are used, one or more of these pipelines may be out-of-order issue/execution and the rest in-order.

The set of memory access units 964 is coupled to the memory unit 970, which includes a data TLB unit 972 coupled to a data cache unit 974 coupled to a level 2 (L2) cache unit 976. In one exemplary embodiment, the memory access units 964 may include a load unit, a store address unit, and a store data unit, each of which is coupled to the data TLB unit 972 in the memory unit 970. The instruction cache unit 934 is further coupled to a level 2 (L2) cache unit 976 in the memory unit 970. The L2 cache unit 976 is coupled to one or more other levels of cache and eventually to a main memory.

By way of example, the exemplary register renaming, out-of-order issue/execution core architecture may implement the pipeline 900 as follows: 1) the instruction fetch 938 performs the fetch and length decoding stages 902 and 904; 2) the decode unit 940 performs the decode stage 906; 3) the rename/allocator unit 952 performs the allocation stage 908 and renaming stage 910; 4) the scheduler unit(s) 956 performs the schedule stage 912; 5) the physical register file(s) unit(s) 958 and the memory unit 970 perform the register read/memory read stage 914; the execution cluster 960 perform the execute stage 916; 6) the memory unit 970 and the physical register file(s) unit(s) 958 perform the write back/memory write stage 918; 7) various units may be involved in the exception handling stage 922; and 8) the retirement unit 954 and the physical register file(s) unit(s) 958 perform the commit stage 924.

The core 990 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 990 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 934/974 and a shared L2 cache unit 976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 10B:
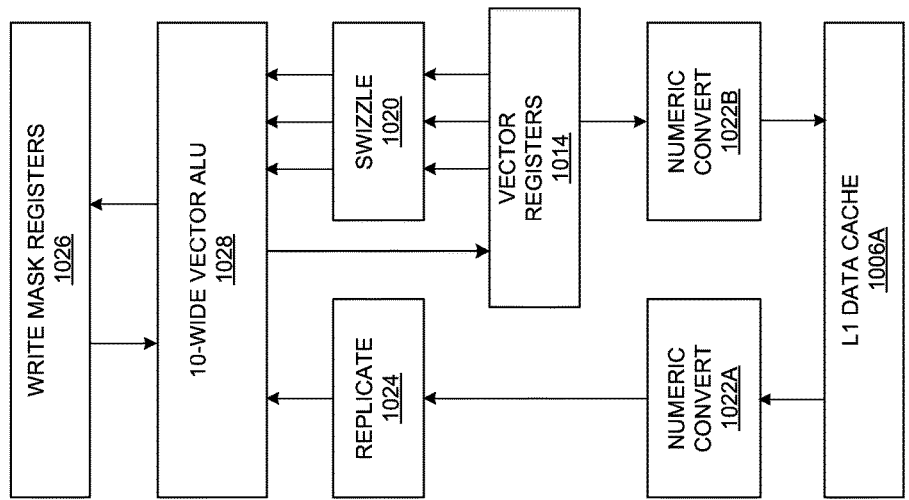
FIG. 10B is a block diagram of an embodiment of an expanded view of part of the processor core of FIG. 10A.
Figure 10A:
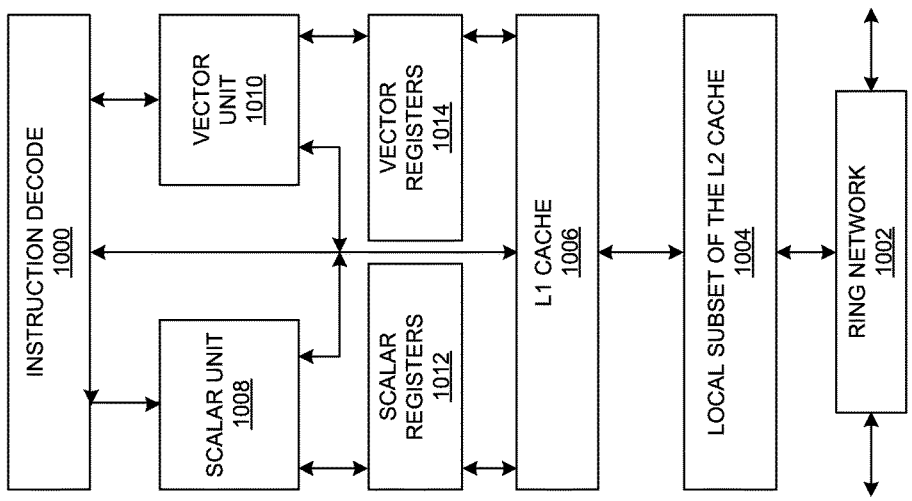
FIG. 10A is a block diagram of an embodiment of a single processor core, along with its connection to the on-die interconnect network, and with its local subset of the Level 2 (L2) cache.

FIGS. 10A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 10A is a block diagram of a single processor core, along with its connection to the on-die interconnect network 1002 and with its local subset of the Level 2 (L2) cache 1004, according to embodiments of the invention. In one embodiment, an instruction decoder 1000 supports the x86 instruction set with a packed data instruction set extension. An L1 cache 1006 allows low-latency accesses to cache memory into the scalar and vector units. While in one embodiment (to simplify the design), a scalar unit 1008 and a vector unit 1010 use separate register sets (respectively, scalar registers 11012 and vector registers 1014) and data transferred between them is written to memory and then read back in from a level 1 (L1) cache 1006, alternative embodiments of the invention may use a different approach (e.g., use a single register set or include a communication path that allow data to be transferred between the two register files without being written and read back).

The local subset of the L2 cache 1004 is part of a global L2 cache that is divided into separate local subsets, one per processor core. Each processor core has a direct access path to its own local subset of the L2 cache 1004. Data read by a processor core is stored in its L2 cache subset 1004 and can be accessed quickly, in parallel with other processor cores accessing their own local L2 cache subsets. Data written by a processor core is stored in its own L2 cache subset 1004 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 10B is an expanded view of part of the processor core in FIG. 10A according to embodiments of the invention. FIG. 10B includes an L1 data cache 1006A part of the L1 cache 1004, as well as more detail regarding the vector unit 1010 and the vector registers 1014. Specifically, the vector unit 1010 is a 16-wide vector processing unit (VPU) (see the 16-wide ALU 1028), which executes one or more of integer, single-precision float, and double-precision float instructions. The VPU supports swizzling the register inputs with swizzle unit 1020, numeric conversion with numeric convert units 1022A-B, and replication with replication unit 1024 on the memory input. Write mask registers 1026 allow predicating resulting vector writes.

Processor with Integrated Memory Controller and Graphics

Figure 11:
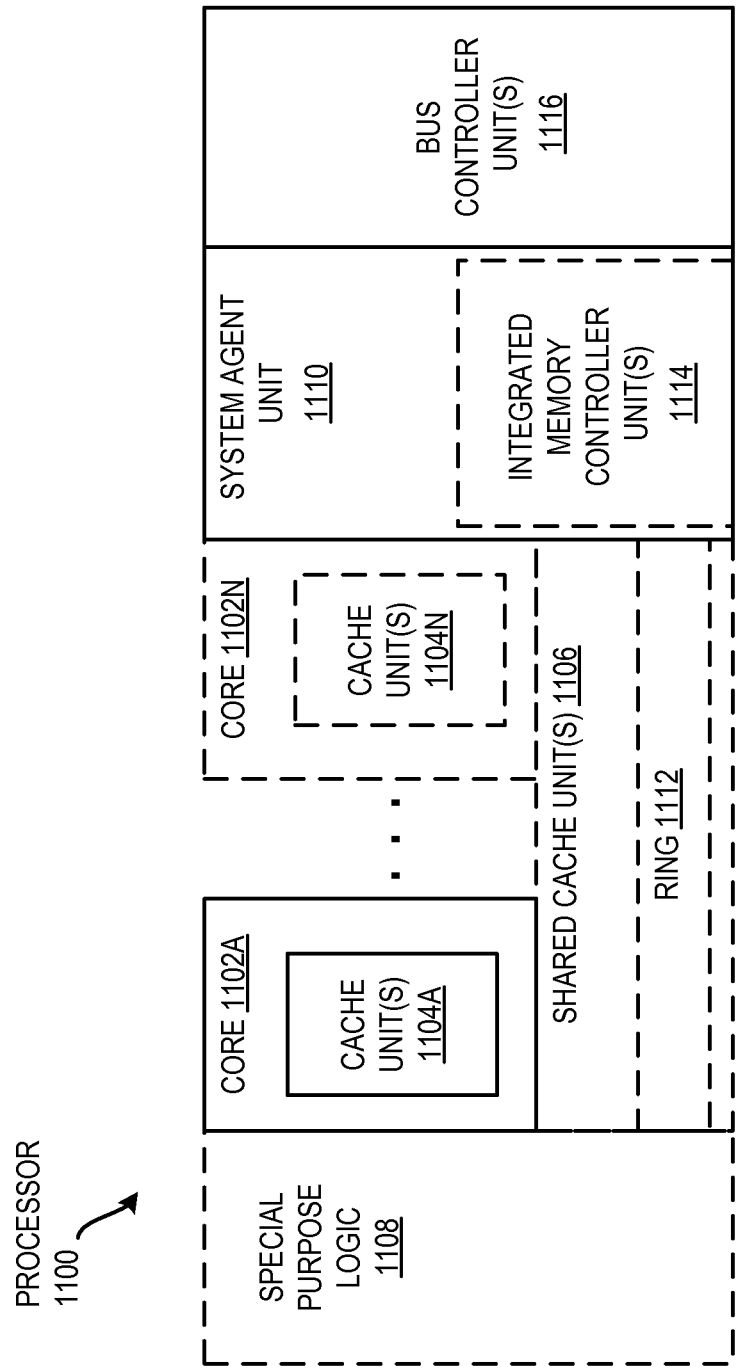
FIG. 11 is a block diagram of an embodiment of a processor that may have more than one core, may have an integrated memory controller, and may have integrated graphics.

FIG. 11 is a block diagram of a processor 1100 that may have more than one core, may have an integrated memory controller, and may have integrated graphics according to embodiments of the invention. The solid lined boxes in FIG. 11 illustrate a processor 1100 with a single core 1102A, a system agent 1110, a set of one or more bus controller units 1116, while the optional addition of the dashed lined boxes illustrates an alternative processor 1100 with multiple cores 1102A-N, a set of one or more integrated memory controller unit(s) 1114 in the system agent unit 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof. While in one embodiment a ring based interconnect unit 1112 interconnects the integrated graphics logic 1108, the set of shared cache units 1106, and the system agent unit 1110/integrated memory controller unit(s) 1114, alternative embodiments may use any number of well-known techniques for interconnecting such units. In one embodiment, coherency is maintained between one or more cache units 1106 and cores 1102-A-N.

In some embodiments, one or more of the cores 1102A-N are capable of multi-threading. The system agent 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture instruction set; that is, two or more of the cores 1102A-N may be capable of execution the same instruction set, while others may be capable of executing only a subset of that instruction set or a different instruction set.

Exemplary Computer Architectures

FIGS. 12-21 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 12:
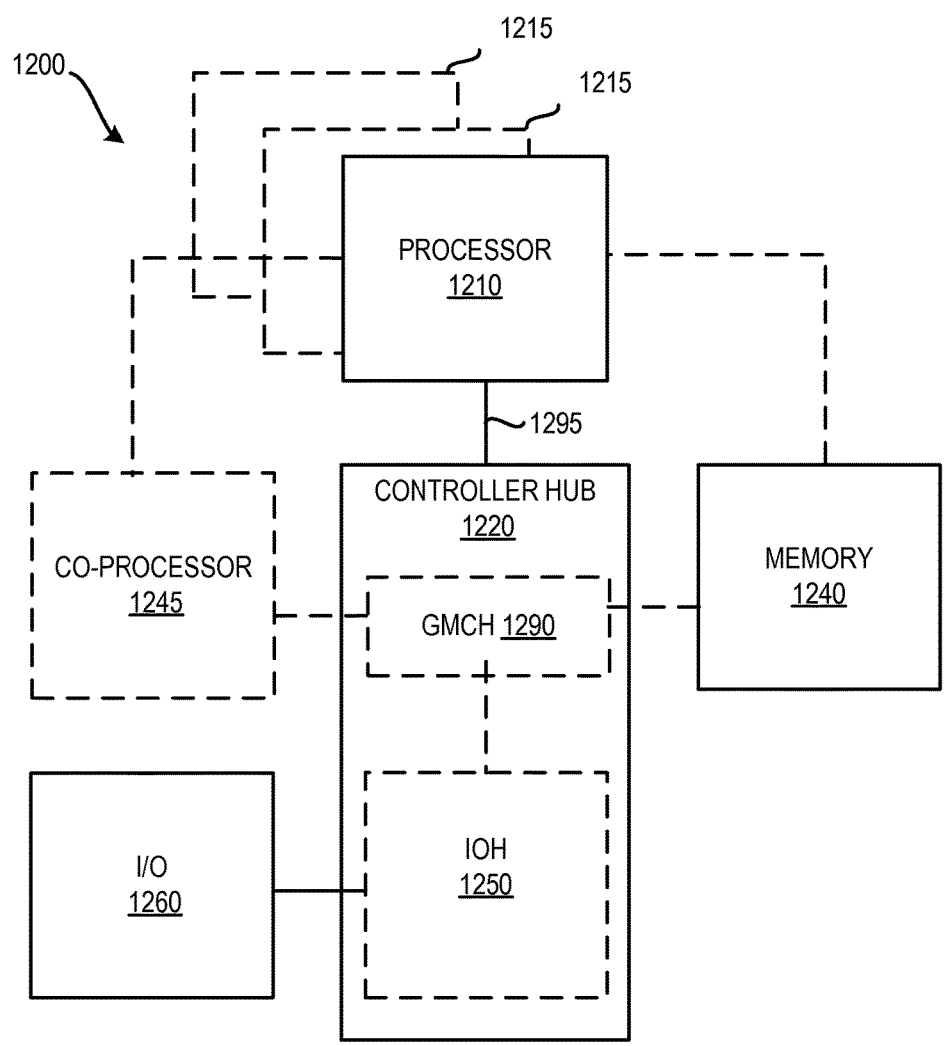
FIG. 12 is a block diagram of a first embodiment of a computer architecture.

Referring now to FIG. 12, shown is a block diagram of a system 1200 in accordance with one embodiment of the present invention. The system 1200 may include one or more processors 1210, 1215, which are coupled to a controller hub 1220. In one embodiment the controller hub 1220 includes a graphics memory controller hub (GMCH) 1290 and an Input/Output Hub (IOH) 1250 (which may be on separate chips); the GMCH 1290 includes memory and graphics controllers to which are coupled memory 1240 and a coprocessor 1245; the IOH 1250 is couples input/output (I/O) devices 1260 to the GMCH 1290. Alternatively, one or both of the memory and graphics controllers are integrated within the processor (as described herein), the memory 1240 and the coprocessor 1245 are coupled directly to the processor 1210, and the controller hub 1220 in a single chip with the IOH 1250.

The optional nature of additional processors 1215 is denoted in FIG. 12 with broken lines. Each processor 1210, 1215 may include one or more of the processing cores described herein and may be some version of the processor 1100.

The memory 1240 may be, for example, dynamic random access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface such as QuickPath Interconnect (QPI), or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the physical resources 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor(s) 1245 accept and execute the received coprocessor instructions.

Figure 13:
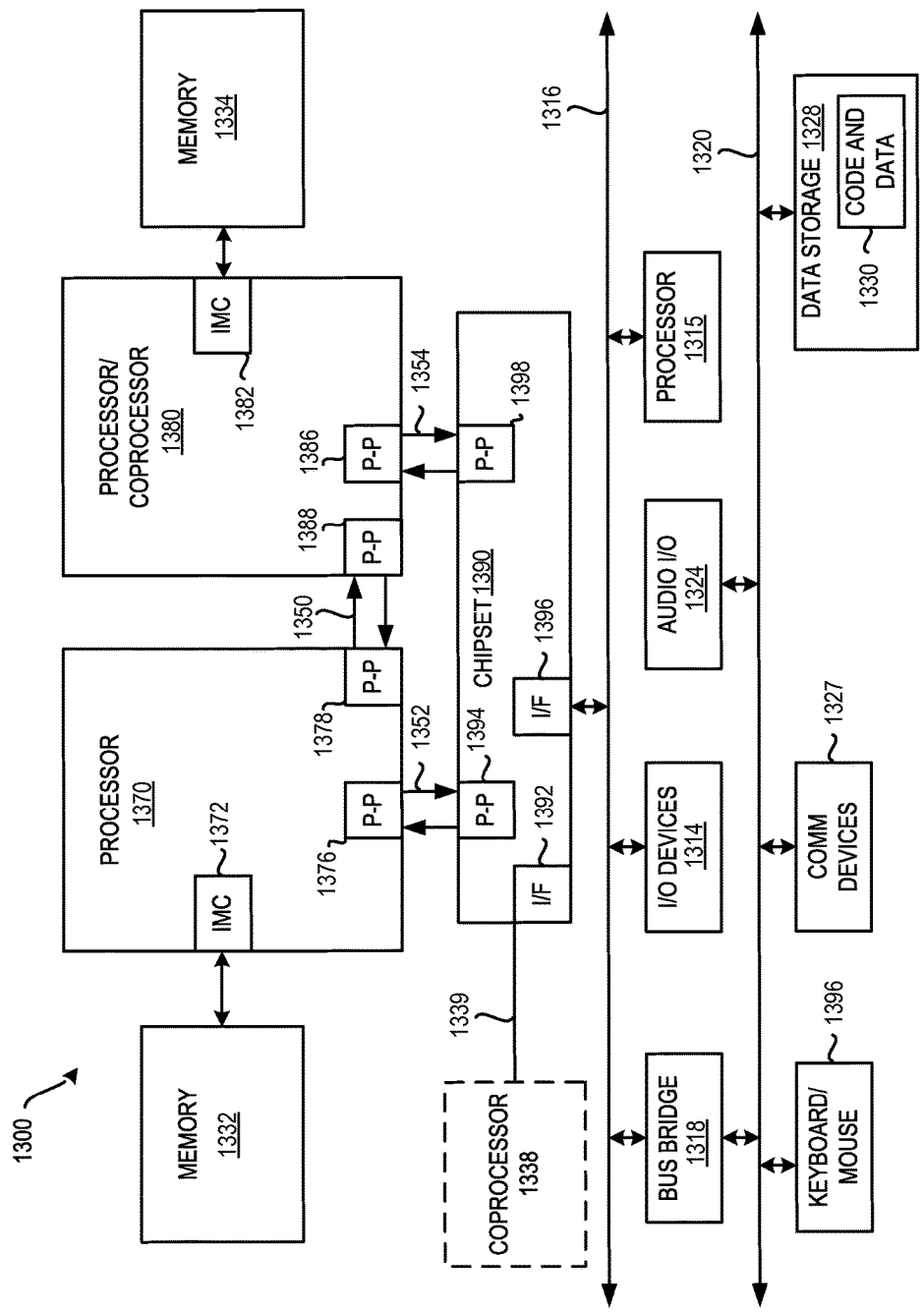
FIG. 13 is a block diagram of a second embodiment of a computer architecture.

Referring now to FIG. 13, shown is a block diagram of a first more specific exemplary system 1300 in accordance with an embodiment of the present invention. As shown in FIG. 13, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment of the invention, processors 1370 and 1380 are respectively processors 1210 and 1215, while coprocessor 1338 is coprocessor 1245. In another embodiment, processors 1370 and 1380 are respectively processor 1210 coprocessor 1245.

Processors 1370 and 1380 are shown including integrated memory controller (IMC) units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 13, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1339. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present invention is not so limited.

As shown in FIG. 13, various I/O devices 1314 may be coupled to first bus 1316, along with a bus bridge 1318 which couples first bus 1316 to a second bus 1320. In one embodiment, one or more additional processor(s) 1315, such as coprocessors, high-throughput MIC processors, GPGPU's, accelerators (such as, e.g., graphics accelerators or digital signal processing (DSP) units), field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 13, a system may implement a multi-drop bus or other such architecture.

Figure 14:
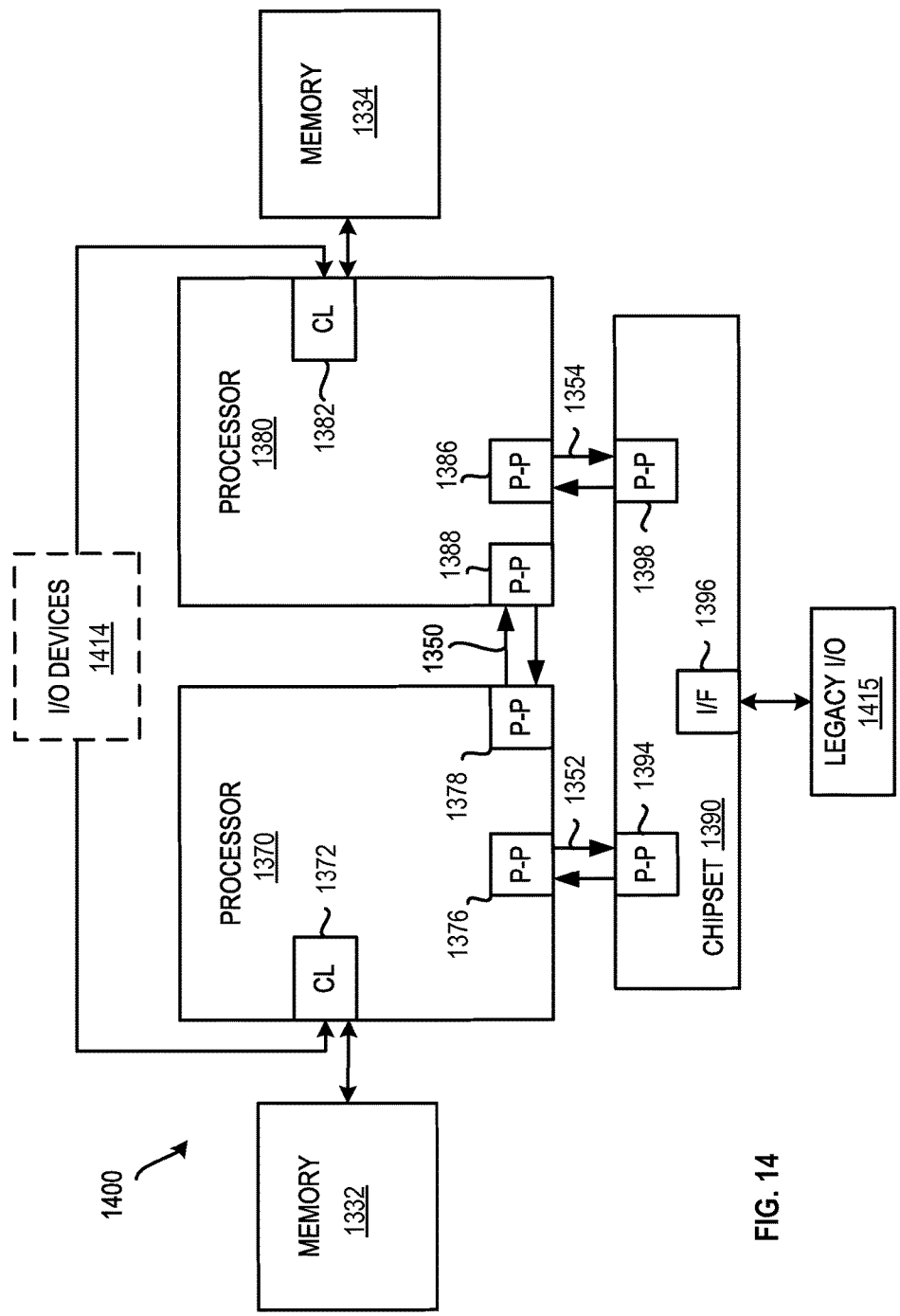
FIG. 14 is a block diagram of a third embodiment of a computer architecture.

Referring now to FIG. 14, shown is a block diagram of a second more specific exemplary system 1400 in accordance with an embodiment of the present invention. Like elements in FIGS. 13 and 14 bear like reference numerals, and certain aspects of FIG. 13 have been omitted from FIG. 14 in order to avoid obscuring other aspects of FIG. 14.

FIG. 14 illustrates that the processors 1370, 1380 may include integrated memory and I/O control logic ("CL") 1372 and 1382, respectively. Thus, the CL 1372, 1382 include integrated memory controller units and include I/O control logic. FIG. 14 illustrates that not only are the memories 1332, 1334 coupled to the CL 1372, 1382, but also that I/O devices 1414 are also coupled to the control logic 1372, 1382. Legacy I/O devices 1415 are coupled to the chipset 1390.

Figure 15:
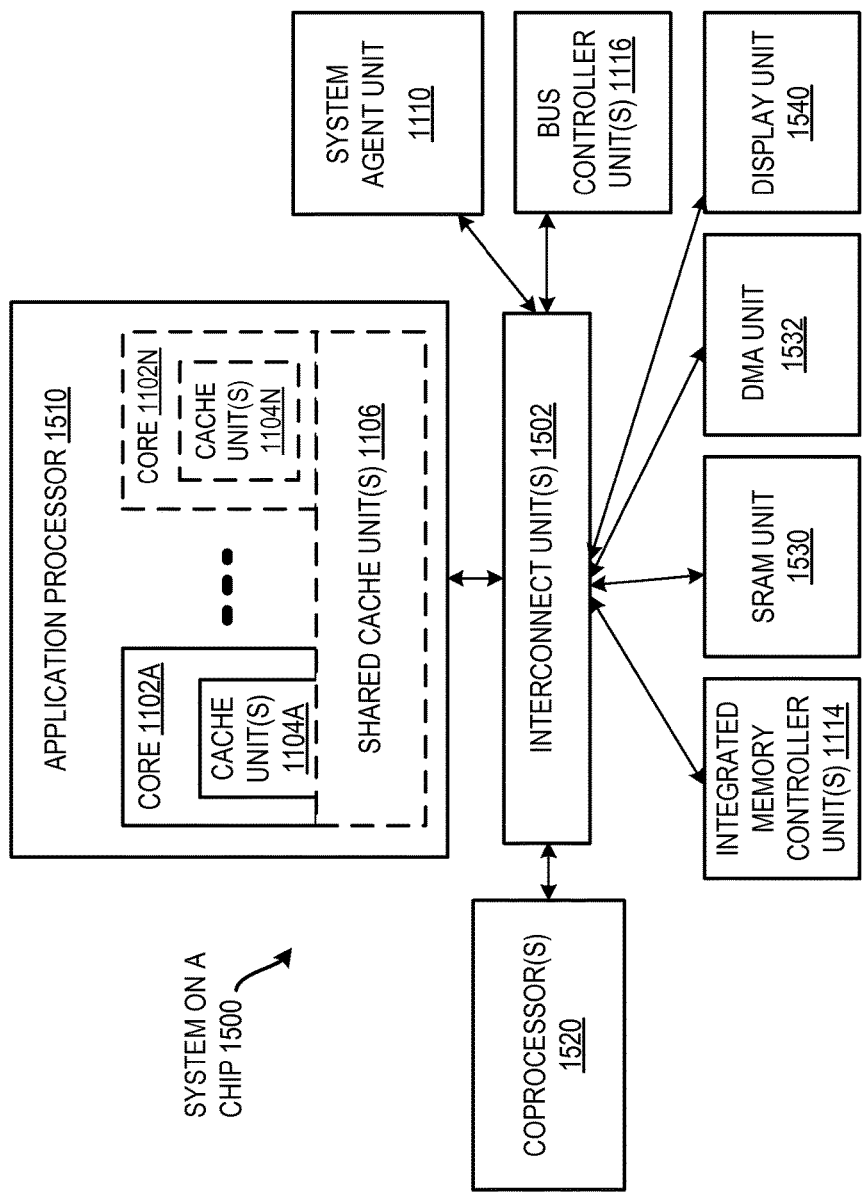
FIG. 15 is a block diagram of a fourth embodiment of a computer architecture.

Referring now to FIG. 15, shown is a block diagram of a SoC 1500 in accordance with an embodiment of the present invention. Similar elements in FIG. 11 bear like reference numerals. Also, dashed lined boxes are optional features on more advanced SoCs. In FIG. 15, an interconnect unit(s) 1502 is coupled to: an application processor 1510 which includes a set of one or more cores 142A-N and shared cache unit(s) 1106; a system agent unit 1110; a bus controller unit(s) 1116; an integrated memory controller unit(s) 1114; a set or one or more coprocessors 1520 which may include integrated graphics logic, an image processor, an audio processor, and a video processor; an static random access memory (SRAM) unit 1530; a direct memory access (DMA) unit 1532; and a display unit 1540 for coupling to one or more external displays. In one embodiment, the coprocessor(s) 1520 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 13, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 16:
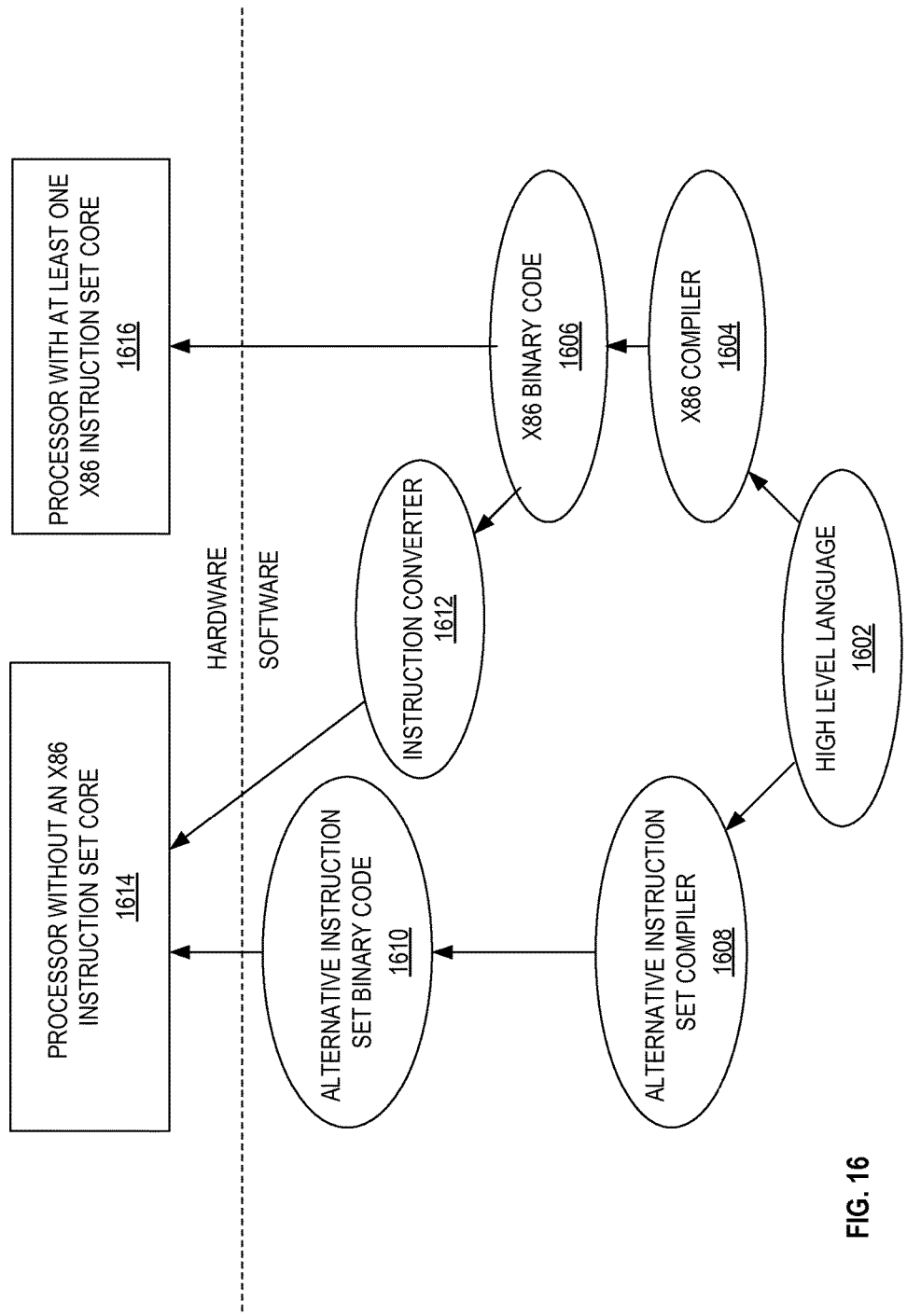
FIG. 16 is a block diagram of use of a software instruction converter to convert binary instructions in a source instruction set to binary instructions in a target instruction set, according to embodiments of the invention.

FIG. 16 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 16 shows a program in a high level language 1602 may be compiled using an x86 compiler 1604 to generate x86 binary code 1606 that may be natively executed by a processor with at least one x86 instruction set core 1616. The processor with at least one x86 instruction set core 1616 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1604 represents a compiler that is operable to generate x86 binary code 1606 (e.g., object code) that can, with or without additional linkage processing, be executed on the processor with at least one x86 instruction set core 1616. Similarly, FIG. 16 shows the program in the high level language 1602 may be compiled using an alternative instruction set compiler 1608 to generate alternative instruction set binary code 1610 that may be natively executed by a processor without at least one x86 instruction set core 1614 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1612 is used to convert the x86 binary code 1606 into code that may be natively executed by the processor without an x86 instruction set core 1614. This converted code is not likely to be the same as the alternative instruction set binary code 1610 because an instruction converter capable of this is difficult to make; however, the converted code will accomplish the general operation and be made up of instructions from the alternative instruction set. Thus, the instruction converter 1612 represents software, firmware, hardware, or a combination thereof that, through emulation, simulation or any other process, allows a processor or other electronic device that does not have an x86 instruction set processor or core to execute the x86 binary code 1606.

Components, features, and details described for any of FIGS. 3-8 may also optionally apply to any of FIGS. 1-2. Moreover, components, features, and details described for any of the apparatus may also optionally apply to any of the methods, which in embodiments may be performed by and/or with such apparatus. Any of the processors described herein may be included in any of the computer systems disclosed herein (e.g., FIGS. 12-15). In some embodiments, the computer system may include a dynamic random access memory (DRAM). Alternatively, the computer system may include a type of volatile memory that does not need to be refreshed or flash memory. The instructions disclosed herein may be performed with any of the processors shown herein, having any of the microarchitectures shown herein, on any of the systems shown herein.

In the description and claims, the terms "coupled" and/or "connected," along with their derivatives, may have be used. These terms are not intended as synonyms for each other. Rather, in embodiments, "connected" may be used to indicate that two or more elements are in direct physical and/or electrical contact with each other. "Coupled" may mean that two or more elements are in direct physical and/or electrical contact with each other. However, "coupled" may also mean that two or more elements are not in direct contact with each other, but yet still co-operate or interact with each other. For example, an execution unit may be coupled with a register and/or a decode unit through one or more intervening components. In the figures, arrows are used to show connections and couplings.

The term "and/or" may have been used. As used herein, the term "and/or" means one or the other or both (e.g., A and/or B means A or B or both A and B).

In the description above, specific details have been set forth in order to provide a thorough understanding of the embodiments. However, other embodiments may be practiced without some of these specific details. The scope of the invention is not to be determined by the specific examples provided above, but only by the claims below. In other instances, well-known circuits, structures, devices, and operations have been shown in block diagram form and/or without detail in order to avoid obscuring the understanding of the description. Where considered appropriate, reference numerals, or terminal portions of reference numerals, have been repeated among the figures to indicate corresponding or analogous elements, which may optionally have similar or the same characteristics, unless specified or clearly apparent otherwise.

Certain operations may be performed by hardware components, or may be embodied in machine-executable or circuit-executable instructions, that may be used to cause and/or result in a machine, circuit, or hardware component (e.g., a processor, potion of a processor, circuit, etc.) programmed with the instructions performing the operations. The operations may also optionally be performed by a combination of hardware and software. A processor, machine, circuit, or hardware may include specific or particular circuitry or other logic (e.g., hardware potentially combined with firmware and/or software) is operative to execute and/or process the instruction and store a result in response to the instruction.

Some embodiments include an article of manufacture (e.g., a computer program product) that includes a machine-readable medium. The medium may include a mechanism that provides, for example stores, information in a form that is readable by the machine. The machine-readable medium may provide, or have stored thereon, an instruction or sequence of instructions, that if and/or when executed by a machine are operative to cause the machine to perform and/or result in the machine performing one or operations, methods, or techniques disclosed herein.

In some embodiments, the machine-readable medium may include a non-transitory machine-readable storage medium. For example, the non-transitory machine-readable storage medium may include a floppy diskette, an optical storage medium, an optical disk, an optical data storage device, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, a phase-change data storage material, a non-volatile memory, a non-volatile data storage device, a non-transitory memory, a non-transitory data storage device, or the like. The non-transitory machine-readable storage medium does not consist of a transitory propagated signal. In some embodiments, the storage medium may include a tangible medium that includes solid matter.

Examples of suitable machines include, but are not limited to, a general-purpose processor, a special-purpose processor, a digital logic circuit, an integrated circuit, or the like. Still other examples of suitable machines include a computer system or other electronic device that includes a processor, a digital logic circuit, or an integrated circuit. Examples of such computer systems or electronic devices include, but are not limited to, desktop computers, laptop computers, notebook computers, tablet computers, netbooks, smartphones, cellular phones, servers, network devices (e.g., routers and switches.), Mobile Internet devices (MIDs), media players, smart televisions, nettops, set-top boxes, and video game controllers.

Reference throughout this specification to "one embodiment," "an embodiment," "one or more embodiments," "some embodiments," for example, indicates that a particular feature may be included in the practice of the invention but is not necessarily required to be. Similarly, in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects lie in less than all features of a single disclosed embodiment. Thus, the claims following the Detailed Description are hereby expressly incorporated into this Detailed Description, with each claim standing on its own as a separate embodiment of the invention.

EXAMPLE EMBODIMENTS

The following examples pertain to further embodiments. Specifics in the examples may be used anywhere in one or more embodiments.

Example 1 is a processor including a decode unit to decode a keyed-hash message authentication code (MAC) with obfuscated key information instruction that is to correspond to a keyed-hash MAC algorithm that is to include a cryptographic hash algorithm. The keyed-hash MAC with obfuscated key information instruction to indicate a message, to indicate obfuscated key information, and to indicate a destination storage location. An execution unit is coupled with the decode unit. The execution unit, in response to the keyed-hash MAC with obfuscated key information instruction, is to store a message authentication code (MAC) corresponding to the indicated message in the destination storage location.

Example 2 includes the processor of Example 1, in which the decode unit is to decode the instruction that is to indicate the obfuscated key information from which a cryptographic key, on which the MAC is to be based, cannot be derived without a secret of the processor that is not accessible to software.

Example 3 includes the processor of Example 1, in which the execution unit, in response to the instruction, is to store the MAC which is not to be consistent with the keyed-hash MAC algorithm if evaluated with the indicated message and the obfuscated key information.

Example 4 includes the processor of any one of Examples 1 to 3, in which the decode unit is to decode the instruction that is to indicate the obfuscated key information which is to include an encryption of key information, in which the key information is to be used to generate the MAC.

Example 5 includes the processor of Example 4, in which the encryption of the key information is to include an encryption of a cryptographic key.

Example 6 includes the processor of Example 4, in which the encryption of the key information is to include an encryption of at least one evaluation of a portion of the keyed-hash MAC algorithm that is to involve a cryptographic key.

Example 7 includes the processor of Example 6, in which the encryption of the evaluation of the portion of the keyed-hash MAC algorithm that is to involve the cryptographic key is to include at least one of: (1) an encryption of an evaluation of the cryptographic hash algorithm with both an initial state of the keyed-hash MAC algorithm and an exclusive OR (XOR) of the cryptographic key and an inner pad value; and (2) an encryption of an evaluation of the cryptographic hash algorithm with both the initial state of the keyed-hash MAC algorithm and an exclusive OR of the cryptographic key and an outer pad value.

Example 8 includes the processor of any one of Examples 4 to 7, further including a secret key that is not accessible to software, and in which the execution unit includes a decryption unit that in response to the instruction is to use the secret key to decrypt the encryption of the key information.

Example 9 includes the processor of any one of Examples 1 to 3, in which the decode unit is to decode the instruction that is to indicate the obfuscated key information that is to include a key information indication value.

Example 10 includes the processor of Example 9, in which the key information indication value is to be one of a key information index, a key information number, and a key information identifier.

Example 11 includes the processor of any one of Examples 1 to 3, in which the decode unit is to decode the instruction that is to indicate the obfuscated key information which is to include authenticatable key information, and in which the execution unit is operative to: (1) attempt to authenticate the authenticatable key information; and (2) signal a fault if the attempt to authenticate the authenticatable key information does not succeed.

Example 12 includes the processor of any one of Examples 1 to 11, in which the execution unit, in response to a second keyed-hash MAC with obfuscated key information instruction, is to: (1) stop performing the second keyed-hash MAC with obfuscated key information instruction after an interruption; (2) encrypt an intermediate state associated with performance of the second keyed-hash MAC instruction with a secret key of the processor that is not accessible to software; and (3) store the encrypted intermediate state in a storage location.

Example 13 includes the processor of any one of Examples 1 to 11, in which the execution unit, in response to a second keyed-hash MAC with obfuscated key information instruction, is to: (1) stop performing the second keyed-hash MAC with obfuscated key information instruction after an interruption; and (2) discard an intermediate state associated with performance of the second keyed-hash MAC instruction.

Example 14 includes the processor of any one of Examples 1 to 13, in which the cryptographic hash algorithm is to be one of MD5, SHA-1, SHA-2, and RIPEMD.

Example 15 includes the processor of Example 14, in which the cryptographic hash algorithm is to be one of said MD5 and said SHA-1.

Example 16 includes the processor of any one of Examples 1 to 15, in which the decode unit is to decode the instruction that is to have a field to indicate the cryptographic hash algorithm as any one of a plurality of different cryptographic hash algorithms.

Example 17 includes the processor of any one of Examples 1 to 16, in which the decode unit is to decode the instruction that is to indicate a length of the message.

Example 18 includes the processor of any one of Examples 1 to 17, in which the decode unit is to decode the instruction that is to indicate a length of the MAC that is to be stored in the destination storage location.

Example 19 includes the processor of any one of Examples 1 to 18, further including a plurality of general-purpose registers and a plurality of packed data registers. The decode unit is to decode the instruction that is optionally to indicate a general-purpose register of the plurality that is to have an indication of a location in a memory that is to store the message, and in which the instruction is to optionally indicate a packed data register of the plurality as the destination storage location.

Example 20 is method in a processor that includes receiving a keyed-hash message authentication code (MAC) with obfuscated key information instruction that corresponds to a keyed-hash MAC algorithm that uses a cryptographic hash algorithm. The keyed-hash MAC with obfuscated key information instruction indicates a message, indicates obfuscated key information, and indicates a destination storage location. The method also includes storing a message authentication code (MAC) corresponding to the indicated message in the indicated destination storage location, in response to the keyed-hash MAC with obfuscated key information instruction.

Example 21 includes the method of Example 20, in which receiving includes receiving the instruction that indicates the obfuscated key information from which a cryptographic key, on which the MAC is based, cannot be derived without a secret of the processor that is not accessible to software.

Example 22 includes the method of Example 20, in which receiving includes receiving the instruction that indicates the obfuscated key information that includes an encryption of key information.

Example 23 includes the method of Example 20, in which receiving includes receiving the instruction that indicates the obfuscated key information that includes a key information indication value that indicates key information but does not include key information and does not include an encryption of key information.

Example 24 is a system to process instructions that includes an interconnect, a processor coupled with the interconnect, and a dynamic random access memory (DRAM) coupled with the interconnect. The processor is to receive a keyed-hash message authentication code (MAC) with obfuscated key information instruction that is to correspond to a keyed-hash MAC algorithm that is to include a cryptographic hash algorithm. The keyed-hash MAC with obfuscated key information instruction is to indicate a message, to indicate obfuscated key information, and to indicate a destination storage location. The processor, in response to the keyed-hash MAC with obfuscated key information instruction, is to store a message authentication code (MAC) corresponding to the indicated message in the destination storage location.

Example 25 includes the system of Example 24, in which the instruction is to indicate the obfuscated key information which is to include an encryption of key information, in which the key information is to be used to generate the MAC.

Example 26 is an article of manufacture including a non-transitory machine-readable storage medium. The non-transitory machine-readable storage medium stores a keyed-hash message authentication code (MAC) with obfuscated key information instruction. The keyed-hash MAC with obfuscated key information instruction is to correspond to a keyed-hash MAC algorithm that is to use a cryptographic hash algorithm. The keyed-hash MAC with obfuscated key information instruction is to indicate a message, to indicate obfuscated key information, and to indicate a destination storage location. The keyed-hash MAC with obfuscated key information instruction, if executed by a machine, is to cause the machine to perform operations including store a message authentication code (MAC) corresponding to the indicated message in the indicated destination storage location.

Example 27 includes the article of manufacture of Example 26, in which the instruction is to indicate the obfuscated key information which is to include a key information indication value.

Example 28 includes the processor of any one of Examples 1 to 19, further including an optional branch prediction unit to predict branches, and an optional instruction prefetch unit, coupled with the branch prediction unit, the instruction prefetch unit to prefetch instructions including the instruction. The processor may also optionally include an optional level 1 (L1) instruction cache coupled with the instruction prefetch unit, the L1 instruction cache to store instructions, an optional L1 data cache to store data, and an optional level 2 (L2) cache to store data and instructions. The processor may also optionally include an instruction fetch unit coupled with the decode unit, the L1 instruction cache, and the L2 cache, to fetch the instruction, in some cases from one of the L1 instruction cache and the L2 cache, and to provide the instruction to the decode unit. The processor may also optionally include a register rename unit to rename registers, an optional scheduler to schedule one or more operations that have been decoded from the instruction for execution, and an optional commit unit to commit execution results of the instruction.

Example 29 is a processor or other apparatus to perform or operative to perform the method of any one of Examples 20 to 23.

Example 30 is a processor or other apparatus that includes means for performing the method of any one of Examples 20 to 23.

Example 31 is an article of manufacture that includes an optionally non-transitory machine-readable medium, which optionally stores or otherwise provides an instruction, which if and/or when executed by a processor, computer system, electronic device, or other machine, is operative to cause the machine to perform the method of any one of Examples 20 to 23.

Example 32 is a processor or other apparatus substantially as described herein.

Example 33 is a processor or other apparatus that is operative to perform any method substantially as described herein.

Example 34 is a processor or other apparatus to perform (e.g., that has components to perform or that is operative to perform) any instruction substantially as described herein.

Example 35 is a computer system or other electronic device that includes a processor having a decode unit to decode instructions of a first instruction set. The processor also has one or more execution units. The electronic device also includes a storage device coupled with the processor. The storage device is to store a first instruction, which may be any of the instructions substantially as disclosed herein, and which is to be of a second instruction set. The storage device is also to store instructions to convert the first instruction into one or more instructions of the first instruction set. The one or more instructions of the first instruction set, when performed by the processor, are to cause the processor to emulate the first instruction.

What is claimed is:
1. A processor comprising:
a register file including a plurality of packed data registers;
a decode unit on a die to decode a keyed-hash message authentication code (MAC) with obfuscated key information instruction of an instruction set of the processor that is to correspond to a keyed-hash MAC algorithm that is to include a cryptographic hash algorithm, the keyed-hash MAC with obfuscated key information instruction having an opcode, to indicate a message, to indicate obfuscated key information, and having a field to specify a destination packed data register of the plurality of packed data registers in the register file, wherein the keyed-hash MAC with obfuscated key information instruction is at least one of a macroinstruction and a machine code instruction; and an execution unit on the die and coupled with the decode unit, the execution unit including a cryptographic hash unit to perform the cryptographic hash algorithm, the execution unit, in response to the decode of the keyed-hash MAC with obfuscated key information instruction, to perform the keyed-hash MAC with obfuscated key information instruction to generate and store a message authentication code (MAC) corresponding to the indicated message in the destination packed data register of the plurality of packed data registers in the register file.

2. The processor of claim 1, wherein the processor is a general-purpose processor, and wherein the decode unit is to decode the keyed-hash MAC with obfuscated key information instruction that is to indicate the obfuscated key information from which a cryptographic key, on which the MAC is to be based, cannot be derived without a secret of the processor that is accessible to the execution unit but that is not readable by software.

3. The processor of claim 1, wherein the cryptographic hash algorithm is to be one of MD5, SHA-1, SHA-2, and RIPEMD, and wherein the execution unit, in response to the decode of the keyed-hash MAC with obfuscated key information instruction, is to store the MAC which cannot be derived from the message using the obfuscated key information without a secret that is accessible to the execution unit but that is protected within the processor and not readable by software.

4. The processor of claim 1, wherein the decode unit is to decode the keyed-hash MAC with obfuscated key information instruction that is to indicate the obfuscated key information which is to include an encryption of key information, wherein the execution unit is to use the key information to generate the MAC.

5. The processor of claim 4, wherein the processor is a general-purpose processor, wherein the cryptographic hash algorithm is to be one of MD5, SHA-1, SHA-2, and RIPEMD, and wherein the encryption of the key information is to include an encryption of a cryptographic key.

6. The processor of claim 4, wherein the cryptographic hash algorithm is to be one of MD5, SHA-1, SHA-2, and RIPEMD, wherein the encryption of the key information is to include an encryption of at least one evaluation of a portion of the keyed-hash MAC algorithm that is to involve a cryptographic key.

7. The processor of claim 6, wherein the encryption of the evaluation of the portion of the keyed-hash MAC algorithm that is to involve the cryptographic key is to include at least one of:
   an encryption of an evaluation of the cryptographic hash algorithm with both an initial state of the keyed-hash MAC algorithm and an exclusive OR (XOR) of the cryptographic key and an inner pad value; and
   an encryption of an evaluation of the cryptographic hash algorithm with both the initial state of the keyed-hash MAC algorithm and an exclusive OR of the cryptographic key and an outer pad value.

8. The processor of claim 4, wherein the processor is a general-purpose processor, further comprising a secret key that is accessible to the execution unit but that is not readable by software, and wherein the execution unit includes a decryption unit that in response to the decode of the keyed-hash MAC with obfuscated key information instruction is to use the secret key to decrypt the encryption of the key information.

9. The processor of claim 1, wherein the decode unit is to decode the keyed-hash MAC with obfuscated key information instruction that is to indicate the obfuscated key information that is to include a key information indication value.

10. The processor of claim 9, wherein the key information indication value is to be one of a key information index, a key information number, and a key information identifier.

11. The processor of claim 1, wherein the cryptographic hash algorithm is to be one of MD5, SHA-1, SHA-2, and RIPEMD, and wherein the decode unit is to decode the keyed-hash MAC with obfuscated key information instruction that is to indicate the obfuscated key information which is to include authenticatable key information, and wherein the execution unit is operative to:
   attempt to authenticate the authenticatable key information; and
   signal a fault if the attempt to authenticate the authenticatable key information does not succeed.

12. The processor of claim 1, wherein the cryptographic hash algorithm is to be one of MD5, SHA-1, SHA-2, and RIPEMD, and wherein the execution unit, in response to a decode of a second keyed-hash MAC with obfuscated key information instruction, is to:
   stop performing the second keyed-hash MAC with obfuscated key information instruction after an interruption;
   encrypt an intermediate state associated with performance of the second keyed-hash MAC with obfuscated key information instruction with a secret key of the processor that is accessible to the execution unit but that is not readable by software; and
   store the encrypted intermediate state in a storage location.

13. The processor of claim 1, wherein the execution unit, in response to a decode of a second keyed-hash MAC with obfuscated key information instruction, is to:
   stop performing the second keyed-hash MAC with obfuscated key information instruction after an interruption; and
   discard an intermediate state associated with performance of the second keyed-hash MAC with obfuscated key information instruction.

14. The processor of claim 1, wherein the cryptographic hash algorithm is to be one of MD5, SHA-1, SHA-2, and RIPEMD.

15. The processor of claim 14, wherein the processor is a general-purpose processor, and wherein the cryptographic hash algorithm is to be one of said MD5 and said SHA-1.

16. The processor of claim 1, wherein the decode unit is to decode the keyed-hash MAC with obfuscated key information instruction that is to have a field to indicate the cryptographic hash algorithm as any one of a plurality of different cryptographic hash algorithms.

17. The processor of claim 1, wherein the decode unit is to decode the keyed-hash MAC with obfuscated key information instruction that is to indicate a length of the message.

18. The processor of claim 1, wherein the decode unit is to decode the keyed-hash MAC with obfuscated key information instruction that is to indicate a length of the MAC that is to be stored in the destination packed data register.

19. The processor of claim 1, wherein the decode unit is to decode the keyed-hash MAC with obfuscated key information instruction that is to indicate the obfuscated key information from which a cryptographic key, on which the MAC is to be based, cannot be derived without a secret of the processor that is accessible to the execution unit but that is not readable by software, and wherein the execution unit, in response to a decode of a second keyed-hash MAC with obfuscated key information instruction, is to:

stop performing the second keyed-hash MAC with obfuscated key information instruction after an interruption;
encrypt an intermediate state associated with performance of the second keyed-hash MAC with obfuscated key information instruction with a secret key of the processor that is accessible to the execution unit but that is not readable by software; and
store the encrypted intermediate state in a storage location.

20. The processor of claim 1, wherein the decode unit is to decode the keyed-hash MAC with obfuscated key information instruction that is to indicate the obfuscated key information which is to include an encryption of key information, wherein the execution unit is to use the key information to generate the MAC, and wherein the execution unit, in response to a decode of a second keyed-hash MAC with obfuscated key information instruction, is to:
stop performing the second keyed-hash MAC with obfuscated key information instruction after an interruption; and
discard an intermediate state associated with performance of the second keyed-hash MAC with obfuscated key information instruction.

21. A method in a general-purpose processor comprising:
decoding, with a decode unit of the general-purpose processor, a keyed-hash message authentication code (MAC) with obfuscated key information instruction of an instruction set of the processor that corresponds to a keyed-hash MAC algorithm that uses a cryptographic hash algorithm, the keyed-hash MAC with obfuscated key information instruction having an opcode, indicating a message, indicating obfuscated key information, and having a field specifying a destination architectural packed data register of a set of architectural packed data registers of the processor, wherein the keyed-hash MAC with obfuscated key information instruction is at least one of a macroinstruction and a machine code instruction; and
performing, with an execution unit of the general-purpose processor that includes a cryptographic hash unit to perform the cryptographic hash algorithm, the keyed-hash MAC with obfuscated key information instruction including generating and storing a message authentication code (MAC) corresponding to the indicated message in the specified destination architectural packed data register of the set of architectural packed data registers of the processor.

22. The method of claim 21, wherein said decoding comprises decoding the keyed-hash MAC with obfuscated key information instruction that indicates the obfuscated key information from which a cryptographic key, on which the MAC is based, cannot be derived without a secret of the processor that is accessible to the execution unit but that is not readable by software.

23. The method of claim 21, wherein said decoding comprises decoding the keyed-hash MAC with obfuscated key information instruction that indicates the obfuscated key information that includes one of:
an encryption of key information; and
a key information indication value that indicates key information but does not include key information and does not include an encryption of key information.

24. A system to process instructions comprising:
an interconnect;
a processor coupled with the interconnect, the processor including a plurality of packed data registers, the processor to perform a keyed-hash message authentication code (MAC) with obfuscated key information instruction of an instruction set of the processor that is to correspond to a keyed-hash MAC algorithm that is to include a cryptographic hash algorithm, the keyed-hash MAC with obfuscated key information instruction having an opcode, to indicate a message, to indicate obfuscated key information, and having a field to specify a destination packed data register of a set of packed data registers of a register file of the processor, wherein the keyed-hash MAC with obfuscated key information instruction is at least one of a macroinstruction and a machine code instruction, the processor including a cryptographic hash unit to perform the cryptographic hash algorithm, the processor, in response to the performance of the keyed-hash MAC with obfuscated key information instruction, to generate and store a message authentication code (MAC) corresponding to the indicated message in the destination packed data register of the register file of the processor; and
a dynamic random access memory (DRAM) coupled with the interconnect.

25. The system of claim 24, wherein the keyed-hash MAC with obfuscated key information instruction is to indicate the obfuscated key information which is to include an encryption of key information, wherein the key information is to be used to generate the MAC.

26. An article of manufacture comprising a non-transitory machine-readable storage medium, the non-transitory machine-readable storage medium storing instructions including a keyed-hash message authentication code (MAC) with obfuscated key information instruction of an instruction set of a processor, the keyed-hash MAC with obfuscated key information instruction being at least one of a macroinstruction and a machine code instruction,
the keyed-hash MAC with obfuscated key information instruction to correspond to a keyed-hash MAC algorithm that is to use a cryptographic hash algorithm, the keyed-hash MAC with obfuscated key information instruction having an opcode, to indicate a message, to indicate obfuscated key information, and having a field to specify a destination architectural packed data register of a set of architectural packed data registers of the processor, the keyed-hash MAC with obfuscated key information instruction when executed by a machine, which includes a cryptographic hash unit to perform the cryptographic hash algorithm, is to cause the machine to perform operations comprising to:
generate a message authentication code (MAC) corresponding to the indicated message; and
store the MAC in the specified destination architectural packed data register of the set of architectural packed data registers of the processor.

27. The article of manufacture of claim 26, wherein the keyed-hash MAC with obfuscated key information instruction is to indicate the obfuscated key information which is to include a key information indication value.

* * * * *